(12) United States Patent
Suzuki

(10) Patent No.: US 6,621,780 B2
(45) Date of Patent: Sep. 16, 2003

(54) OPTICAL RECORDING/REPRODUCING METHOD AND APPARATUS

(75) Inventor: Haruyuki Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 421 days.

(21) Appl. No.: 09/741,344

(22) Filed: Dec. 21, 2000

(65) Prior Publication Data

US 2003/0035354 A1 Feb. 20, 2003

(30) Foreign Application Priority Data

Dec. 24, 1999 (JP) .......................................... 11-366806

(51) Int. Cl.$^7$ ................................................. G11B 7/00
(52) U.S. Cl. ..................................... 369/47.53; 369/116
(58) Field of Search ............................. 369/116, 44.51, 369/47.5, 47.53

(56) References Cited

U.S. PATENT DOCUMENTS 5,872,673 A 2/1999 Osakabe
6,134,209 A * 10/2000 Den Boef ................... 369/116

FOREIGN PATENT DOCUMENTS

JP 11-134691 5/1999

* cited by examiner

*Primary Examiner*—Nabil Hindi
(74) *Attorney, Agent, or Firm*—Dickstein Shapiro Morin & Oshinsky LLP

(57) ABSTRACT

In an optical recording/reproducing method and apparatus of the present invention, a modulation parameter is calculated for each of reproduced data signals, each modulation parameter corresponding to one of respective recording powers. An optimum recording power is determined based on a relationship between the modulation parameters and the recording powers, wherein a sequence of pairs of the modulation parameter and the recording power is selected, a gamma, which defines a ratio of a change of the modulation parameter to a change of the recording power, is calculated for each of the selected pairs, and a target recording power corresponding to the optimum recording power is found based on a function derived from a relationship between the calculated gammas and the respective recording powers, the target recording power causing a value of the function to be equal to zero. When selecting the pairs of the modulation parameter and the recording power, a pair of the modulation parameter and the recording power is omitted if a value of the modulation parameter of the pair is not larger than a threshold value, and a pair of the modulation parameter m and the recording power p is selected if a value of the modulation parameter of a following pair first exceeds the threshold value.

22 Claims, 9 Drawing Sheets

```
if (m(i)>th1) then
    if (m_rise=0) then
        m_rise=1
        if (m(i)>th2) then
            P(j)=p(i-1)
            M(j)=m(i-1)
            j=j+1
        end if
    end if
    P(j)=p(i)
    M(j)=m(i)
    j=j+1
end if
```
⎬ 503A

OPTICAL RECORDING/REPRODUCING METHOD AND APPARATUS

BACKGROUND OF THE INVENTION

1. Field of The Invention

The present invention relates to an optical recording/reproducing method and apparatus that records information onto or reproduces information from a storage medium, such as an optical disk, by focusing a light beam, emitted by a light source, onto a recording layer of the storage medium.

2. Description of The Related Art

Recently, there are various optical storage media that are provided for recording and reproducing of information, including CD-DA, CD-ROM, CD-R (compact disk recordable), DVD-ROM, DVD-R (digital versatile disk recordable), etc.

Japanese Laid-Open Patent Application No.11-134691 discloses an optical recording/reproducing method which determines an optimum recording power based on a relationship between the modulation parameters and the recording powers. In this method, a test writing is first performed in which writing a pattern of marks and spaces to an optical storage medium with a recording power is repeated by sequentially changing the recording power with increments. A test reading is next performed in which reading the pattern from the storage medium is repeated, so that data signals are reproduced from the respective patterns on the storage medium. A modulation parameter is then calculated for each of the reproduced data signals, each modulation parameter corresponding to one of the respective recording powers. Then, an optimum recording power is determined based on the relationship between the modulation parameters and the recording powers.

However, in the optical recording/reproducing method of the above document, the algorithm to determine the optimum recording power is inadequate for accurately checking the rising slope of the modulation parameter related to the reproduced data signal. In the optical recording/reproducing method of the above document, variations of the optimum recording power may be produced due to inaccurate checking of the rising slope of the modulation parameter.

Generally, the effective range of the write power, which is supplied to the laser diode, that the laser beam emitted by the laser diode and focused on the storage medium starts forming a mark on the storage medium is very narrow. On the other hand, the locations of the storage medium to which the test patterns are written are limited, and an increase of the amount of increments to the write power level or an increase of the number of the cycles of the test writing/reading will not be an appropriate solution to the problem of inaccurate checking of the rising slope of the modulation parameter.

For example, the recording power is sequentially changed with increments of 1.0 mW from 10.0 mW to 19.0 mW, which falls within a range of ±30% centered around 15.0 mW. In this case, the test writing is repeated ten times by sequentially changing the recording power with such increments.

In a case of CD-RW media, a phase-change recording material is used in the recording layer of the optical disk. The effective range of write power supplied to the laser diode that enables the emitted laser beam focused on the disk to form a mark on the storage medium is very narrow. If the write power is increased by 1 or 2 mW, the amplitude of the reproduced data signal becomes considerably large. Specifically, even if the reproduced signal amplitude is about 0.1 (noise level) at the write power p=14 mW, the reproduced signal amplitude abruptly rises to a high level of 0.5 to 1.4 at the write power p=15 mW that is incremented from 14 mW.

Accordingly, it is desirable that the algorithm to determine the optimum recording power includes a data selection procedure for accurately checking the rising slope of the modulation parameter related to the reproduced data signal. As described above, if the checking of the rising slope of the modulation parameter related to the reproduced data signal is inaccurate, variations of the optimum recording power may be produced.

SUMMARY OF THE INVENTION

An object of the present invention is to provide an optical recording/reproducing method and apparatus that minimizes variations of the optimum recording power through a recording power control algorithm that accurately checks the rising slope of the modulation parameter related to the reproduced data signal.

Another object of the present invention is to provide an optical recording/reproducing method that minimizes variations of the optimum recording power through a recording power control algorithm, so that the optimum recording power is accurately determined without being affected by noise.

Another object of the present invention is to provide an optical recording/reproducing apparatus that minimizes variations of the optimum recording power through a recording power control algorithm, so that the optimum recording power is accurately determined without being affected by noise.

The above-mentioned objects of the present invention are achieved by an optical recording/reproducing method which comprises the steps of: performing a test writing in which writing a pattern of marks and spaces to an optical storage medium with a recording power p is repeated by sequentially changing the recording power p with increments of a predetermined power; performing a test reading in which reading the pattern from the storage medium is repeated, so that data signals are reproduced from the respective patterns on the storage medium; calculating a modulation parameter m for each of the reproduced data signals, each modulation parameter corresponding to one of the respective recording powers; and determining an optimum recording power based on a relationship between the modulation parameters and the respective recording powers, wherein the determining step comprises the steps of: selecting, from all of the modulation parameters and the recording powers, a sequence of pairs of the modulation parameter m and the recording power p; calculating a gamma=$(\Delta m/m)/(\Delta p/p)$ for each of the selected pairs of the modulation parameter m and the recording power p, the gamma defining a ratio of a change of the modulation parameter m, normalized by a modulation parameter value, to a change of the recording power p, normalized by a recording power value; and finding a target recording power corresponding to the optimum recording power based on a function derived from a relationship between the calculated gammas and the respective recording powers, the target recording power causing a value of the function to be equal to zero, wherein, in the selecting step, a pair of the modulation parameter m and the recording power p is omitted if a value of the modulation parameter of the pair is not larger than a first threshold value th1, and a pair of the modulation parameter m and the recording power p is selected if a value of the modulation parameter of a following pair first exceeds the first threshold value th1.

The above-mentioned objects of the present invention are achieved by an optical recording/reproducing method which comprises the steps of: performing a test writing in which writing a pattern of marks and spaces to an optical storage medium with a recording power p is repeated by sequentially changing the recording power p with increments of a predetermined power; performing a test reading in which reading the pattern from the storage medium is repeated, so that data signals are reproduced from the respective patterns on the storage medium; calculating a modulation parameter m for each of the reproduced data signals, each modulation parameter corresponding to one of the respective recording powers; and determining an optimum recording power based on a relationship between the modulation parameters and the respective recording powers, wherein the determining step comprises the steps of: selecting, from all of the modulation parameters and the recording powers, a sequence of pairs of the modulation parameter m and the recording power p; approximating the modulation parameter into a continuous function m(p) of the recording power p based on the selected pairs of the modulation parameter m and the recording power p; and finding a target recording power corresponding to the optimum recording power, based on a derivative function (dm/dp) of the function m(p) with respect to the recording power p, the target recording power causing a value of (dm/dp)*(p/m) to be equal to a predetermined value, wherein, in the selecting step, a pair of the modulation parameter m and the recording power p is omitted if a value of the modulation parameter of the pair is not larger than a first threshold value th1, and a pair of the modulation parameter m and the recording power p is selected if a value of the modulation parameter of a following pair first exceeds the first threshold value th1.

The above-mentioned objects of the present invention are achieved by an optical recording/reproducing method which comprises the steps of: performing an initial test writing in which writing a pattern of marks and spaces to an optical storage medium with a recording power p is repeated by sequentially changing the recording power p with first increments of a predetermined power; performing an initial test reading in which reading the pattern from the storage medium is repeated, so that data signals are reproduced from the respective patterns on the storage medium; calculating a first modulation parameter m for each of the reproduced data signals, each first modulation parameter corresponding to one of the respective recording powers; setting a first recording power pth by finding a pair of the first modulation parameter m and the recording power p, from among all pairs of the first modulation parameters and the respective recording powers, a value of the first modulation parameter of the pair first exceeding a first threshold value th; performing a secondary test writing in which writing the pattern of marks and spaces to the storage medium with the recording power p, substantially centered on the first recording power pth, is repeated by sequentially changing the recording power p with second smaller increments of a predetermined power; performing a secondary test reading in which reading the pattern from the storage medium is repeated, so that data signals are reproduced from the respective patterns on the storage medium; calculating a second modulation parameter m for each of the reproduced data signals, each second modulation parameter corresponding to one of the respective recording powers; selecting, from all of the second modulation parameters and the recording powers, a sequence of pairs of the second modulation parameter m and the recording power p; calculating a gamma=$(\Delta m/m)/(\Delta p/p)$ for each of the selected pairs of the second modulation parameter m and the recording power p, the gamma defining a ratio of a change of the second modulation parameter m, normalized by a modulation parameter value, to a change of the recording power p, normalized by a recording power value; and finding a target recording power corresponding to an optimum recording power based on a function derived from a relationship between the calculated gammas and the respective recording powers, the target recording power causing a value of the function to be equal to zero.

The above-mentioned objects of the present invention are achieved by an optical recording/reproducing method which comprises the steps of: performing an initial test writing in which writing a pattern of marks and spaces to an optical storage medium with a recording power p is repeated by sequentially changing the recording power p with first increments of a predetermined power; performing an initial test reading in which reading the pattern from the storage medium is repeated, so that data signals are reproduced from the respective patterns on the storage medium; calculating a first modulation parameter m for each of the reproduced data signals, each first modulation parameter corresponding to one of the respective recording powers; setting a first recording power pth by finding a pair of the first modulation parameter m and the recording power p, from among all pairs of the first modulation parameters and the respective recording powers, a value of the first modulation parameter of the pair first exceeding a first threshold value th; performing a secondary test writing in which writing the pattern of marks and spaces to the storage medium with the recording power p, substantially centered on the first recording power pth, is repeated by sequentially changing the recording power p with second smaller increments of a predetermined power; performing a secondary test reading in which reading the pattern from the storage medium is repeated, so that data signals are reproduced from the respective patterns on the storage medium; calculating a second modulation parameter m for each of the reproduced data signals, each second modulation parameter corresponding to one of the respective recording powers; selecting, from all of the second modulation parameters and the recording powers, a sequence of pairs of the second modulation parameter m and the recording power p; approximating the second modulation parameter into a continuous function m(p) of the recording power p based on the selected pairs of the second modulation parameter m and the recording power p; and finding a target recording power corresponding to an optimum recording power, based on a derivative function (dm/dp) of the function m(p) with respect to the recording power p, the target recording power causing a value of (dm/dp)*(p/m) to be equal to a predetermined value, The above-mentioned objects of the present invention are achieved by an optical recording/reproducing apparatus comprising: a test writing unit which performs a test writing in which writing a pattern of marks and spaces to an optical storage medium with a recording power p is repeated by sequentially changing the recording power p with increments of a predetermined power; a test reading unit which performs a test reading in which reading the pattern from the storage medium is repeated, so that data signals are reproduced from the respective patterns on the storage medium; a calculation unit which calculates a modulation parameter m for each of the reproduced data signals, each modulation parameter corresponding to one of the respective recording powers; and a determination unit which determines an optimum recording power based on a -relationship between the modulation parameters and the respective recording powers, wherein the determination unit comprises: a selection unit which selects, from all of the modulation parameters and the recording powers, a sequence of pairs of the modulation parameter m and the recording power p; a gamma calculation unit which calculates a gamma=($\Delta$m/m)/($\Delta$p/p) for each of the selected pairs of the modulation parameter m and the recording power p, the gamma defining a ratio of a change of the modulation parameter m, normalized by a modulation parameter value, to a change of the recording power p, normalized by a recording power value; and a target recording power unit which finds a target recording power corresponding to the optimum recording power based on a function derived from a relationship between the calculated gammas and the respective recording powers, the target recording power causing a value of the function to be equal to zero, wherein the selection unit omits a pair of the modulation parameter m and the recording power p if a value of the modulation parameter of the pair is not larger than a first threshold value th1, and selects a pair of the modulation parameter m and the recording power p if a value of the modulation parameter of a following pair first exceeds the first threshold value th1.

The above-mentioned objects of the present invention are achieved by an optical recording/reproducing apparatus comprising: test writing unit which performs a test writing in which writing a pattern of marks and spaces to an optical storage medium with a recording power p is repeated by sequentially changing the recording power p with increments of a predetermined power; a test reading unit which performs a test reading in which reading the pattern from the storage medium is repeated, so that data signals are reproduced from the respective patterns on the storage medium; a calculation unit which calculates a modulation parameter m for each of the reproduced data signals, each modulation parameter corresponding to one of the respective recording powers; and a determination unit which determines an optimum recording power based on a relationship between the modulation parameters and the respective recording powers, wherein the determination unit comprises: a selection unit which selects, from all of the modulation parameters and the recording powers, a sequence of pairs of the modulation parameter m and the recording power p; an approximation unit which approximates the modulation parameter into a continuous function m(p) of the recording power p based on the selected pairs of the modulation parameter m and the recording power p; and a target recording power unit which finds a target recording power corresponding to the optimum recording power, based on a derivative function (dm/dp) of the function m(p) with respect to the recording power p, the target recording power causing a value of (dm/dp)*(p/m) to be equal to a predetermined value, wherein the selection unit omits a pair of the modulation parameter m and the recording power p if a value of the modulation parameter of the pair is not larger than a first threshold value th1, and selects a pair of the modulation parameter m and the recording power p if a value of the modulation parameter of a following pair first exceeds the first threshold value th1.

The above-mentioned objects of the present invention are achieved by an optical recording/reproducing apparatus comprising: a first test writing unit which performs an initial test writing in which writing a pattern of marks and spaces to an optical storage medium with a recording power p is repeated by sequentially changing the recording power p with first increments of a predetermined power; a first test reading unit which performs an initial test reading in which reading the pattern from the storage medium is repeated, so that data signals are reproduced from the respective patterns on the storage medium; a first calculation unit which calculates a first modulation parameter m for each of the reproduced data signals, each first modulation parameter corresponding to one of the respective recording powers; a recording power unit which sets a first recording power pth by finding a pair of the first modulation parameter m and the recording power p, from among all pairs of the first modulation parameters and the respective recording powers, a value of the first modulation parameter of the pair first exceeding a first threshold value th; a second test writing unit which performs a secondary test writing in which writing the pattern of marks and spaces to the storage medium with the recording power p, substantially centered on the first recording power pth, is repeated by sequentially changing the recording power p with second smaller increments of a predetermined power; a second test reading unit which performs a secondary test reading in which reading the pattern from the storage medium is repeated, so that data signals are reproduced from the respective patterns on the storage medium; a second calculation unit which calculates a second modulation parameter m for each of the reproduced data signals, each second modulation parameter corresponding to one of the respective recording powers; a selection unit which selects, from all of the second modulation parameters and the recording powers, a sequence of pairs of the second modulation parameter m and the recording power p; a gamma calculation unit which calculates a gamma=($\Delta$m/m)/($\Delta$p/p) for each of the selected pairs of the second modulation parameter m and the recording power p, the gamma defining a ratio of a change of the second modulation parameter m, normalized by a modulation parameter value, to a change of the recording power p, normalized by a recording power value; and a target recording power unit which finds a target recording power corresponding to an optimum recording power based on a function derived from a relationship between the calculated gammas and the respective recording powers, the target recording power causing a value of the function to be equal to zero.

The above-mentioned objects of the present invention are achieved by an optical recording/reproducing apparatus comprising: a first test writing unit which performs an initial test writing in which writing a pattern of marks and spaces to an optical storage medium with a recording power p is repeated by sequentially changing the recording power p with first increments of a predetermined power; a first test reading unit which performs an initial test reading in which reading the pattern from the storage medium is repeated, so that data signals are reproduced from the respective patterns on the storage medium; a first calculation unit which calculates a first modulation parameter m for each of the reproduced data signals, each first modulation parameter corresponding to one of the respective recording powers; a recording power unit which sets a first recording power pth by finding a pair of the first modulation parameter m and the recording power p, from among all pairs of the first modulation parameters and the respective recording powers, a value of the first modulation parameter of the pair first exceeding a first threshold value th; a second test writing unit which performs a secondary test writing in which writing the pattern of marks and spaces to the storage medium with the recording power p, substantially centered on the first recording power pth, is repeated by sequentially changing the recording power p with second smaller increments of a predetermined power; a second test reading unit which performs a secondary test reading in which reading the pattern from the storage medium is repeated, so that data signals are reproduced from the respective patterns on the storage medium; a second calculation unit which calculates a second modulation parameter m for each of the reproduced data signals, each second modulation parameter corresponding to one of the respective recording powers; a selection unit which selects, from all of the second modulation parameters and the recording powers, a sequence of pairs of the second modulation parameter m and the recording power p; a function approximation unit which approximates the second modulation parameter into a continuous function m(p) of the recording power p based on the selected pairs of the second modulation parameter m and the recording power p; and a target recording power unit which finds a target recording power corresponding to an optimum recording power, based on a derivative function (dm/dp) of the function m(p) with respect to the recording power p, the target recording power causing a value of (dm/dp)*(p/m) to be equal to a predetermined value.

In the optical recording/reproducing method and apparatus of the present invention, when selecting a sequence of pairs of the modulation parameter and the recording power, a pair of the modulation parameter and the recording power is omitted if a value of the modulation parameter of that pair is not larger than a threshold value, and a pair of the modulation parameter m and the recording power p is selected if a value of the modulation parameter of a following pair first exceeds the threshold value.

The recording power control algorithm according to the present invention accurately checks the rising slope of the modulation parameter related to the reproduced data signal, and the optical recording/reproducing method and apparatus of the present invention are effective in minimizing variations of the optimum recording power through the recording power control algorithm and in accurately producing the optimum recording power without being affected by noise. As the selection of an improper recording power can be safely prevented, the optical recording/reproducing method and apparatus of the present invention can provide good recording characteristics and protect the light source of the optical pickup and the recording layer of the optical disk against damage.

BRIEF DESCRIPTION OF THE DRAWINGS

Other objects, features and advantages of the present invention will become apparent from the following detailed description when read in conjunction with the accompanying drawings.

DETAILED DESCRIPTION OF PREFERRED EMBODIMENTS

A description will now be provided of preferred embodiments of the present invention with reference to the accompanying drawings.

Figure 1:
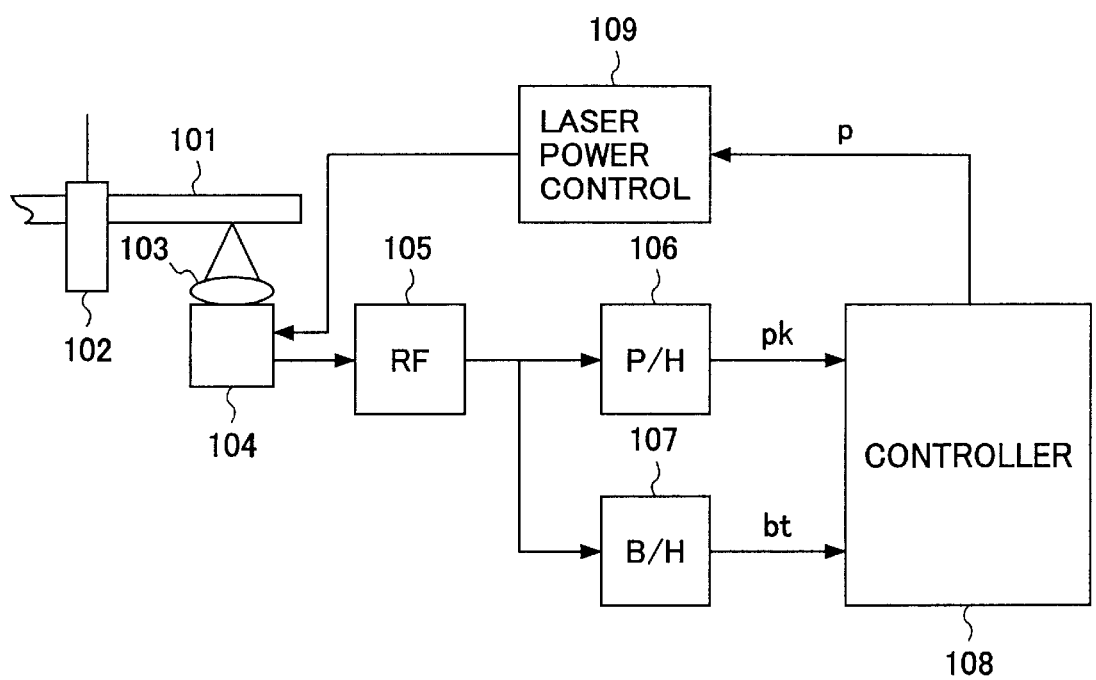
FIG. 1 is a block diagram of one preferred embodiment of the optical recording/reproducing apparatus of the invention.

FIG. 1 shows one preferred embodiment of the optical recording/reproducing apparatus of the invention. As shown in FIG. 1, an optical storage medium 101 in the present embodiment is an optical disk 101. Alternatively, the storage medium 101 may be another read-write storage medium.

In the optical recording/reproducing apparatus of FIG. 1, the optical disk 101 is rotated by a spindle motor 102, and an optical pickup 104 accesses the optical disk 101 when it is rotated. The optical pickup 104 includes a light source (not shown) that emits a light beam to the optical disk 101. In the present embodiment, the light source is, for example, a laser diode (called LD) that emits a laser light beam. A focusing lens 103 focuses the light beam, emitted by the optical pickup 104, onto a recording layer of the optical disk 101.

The optical recording/reproducing apparatus of FIG. 1 carries out the recording of data onto and the reproducing of data from the recording layer of the optical disk 101 by focusing the light beam onto the optical disk recording layer and receiving a reflected light beam from the optical disk recording layer by means of the optical pickup 104.

In the optical recording/reproducing apparatus of FIG. 1, a laser power control unit 109 and a controller 108 are provided. The controller 108 supplies a power signal "p" to the laser power control unit 109, and the laser power control unit 109 controls the power supplied to the LD (the light source) of the optical pickup 104 based on the power signal "p" supplied by the controller 108. Specifically, the laser power control unit 109 drives the LD of the optical pickup 104 with the power indicated by the received power signal "p", such that a test writing power level of the LD of the optical pickup 104 is determined. In accordance with the test writing power level determined by the laser power control unit 109, the optical pickup 104 records a pattern of marks and spaces, which corresponds to a data pattern, indicated by a pulsed signal supplied by a data modulation unit (not shown), onto the recording layer of the optical disk 101 by focusing the laser beam emitted by the LD of the optical pickup 104 (with the test writing power level) onto the recording layer of the optical disk 101.

In the optical pickup 104, the laser beam emitted by the LD is focused onto the recording layer of the optical disk 101 through the focusing lens 103, and a reflected laser beam from the recording layer of the optical disk 101 is received through the focusing lens 103 by a light receiving portion (not shown) of the optical pickup 104. The received laser beam is optoelectrically converted into a data signal by the light receiving portion of the optical pickup 104, and then the optical pickup 104 derives from the received laser beam a reproduced data signal that is indicative of the data recorded on the recording layer of the optical disk 101.

In the optical recording/reproducing apparatus of FIG. 1, the reproduced data signal is supplied from the optical pickup 104 to a radio frequency detection unit (RF) 105. This data signal is amplified at the RF 105, and the amplified data signal is supplied from the RF 105 to a peak-level holding unit (P/H) 106. The P/H 106 detects and holds a peak level of the amplified data signal, and outputs a peak-level signal "pk", which is indicative of the data signal peak level, to the controller 108. In parallel to the P/H 106, the amplified data signal is supplied from the RF 105 to a bottom-level holding unit (B/H) 107. The B/H 107 detects and holds a bottom level of the amplified data signal, and outputs a bottom-level signal "bt", which is indicative of the data signal bottom level, to the controller 108.

In the optical recording/reproducing apparatus of FIG. 1, the controller 108 is formed by a microcomputer generally including a CPU (central processing unit), a program ROM (read-only memory), a data RAM (random access memory), an A/D (analog-to-digital) converter, and a D/A (digital-to-analog) converter, and others. The controller 108 receives both the peak-level signal "pk" output by the P/H 106 and the bottom-level signal "bt" output by the B/H 107, and converts them into respective digital signals through the A/D converter, so that the controller 108 derives the peak level and the bottom level of the data signal from the resulting digital signals. The controller 108 converts a calculated optimum power into an analog signal through the D/A converter, and supplies the analog signal to the laser power control unit 109 as the power signal "p".

Figure 2:
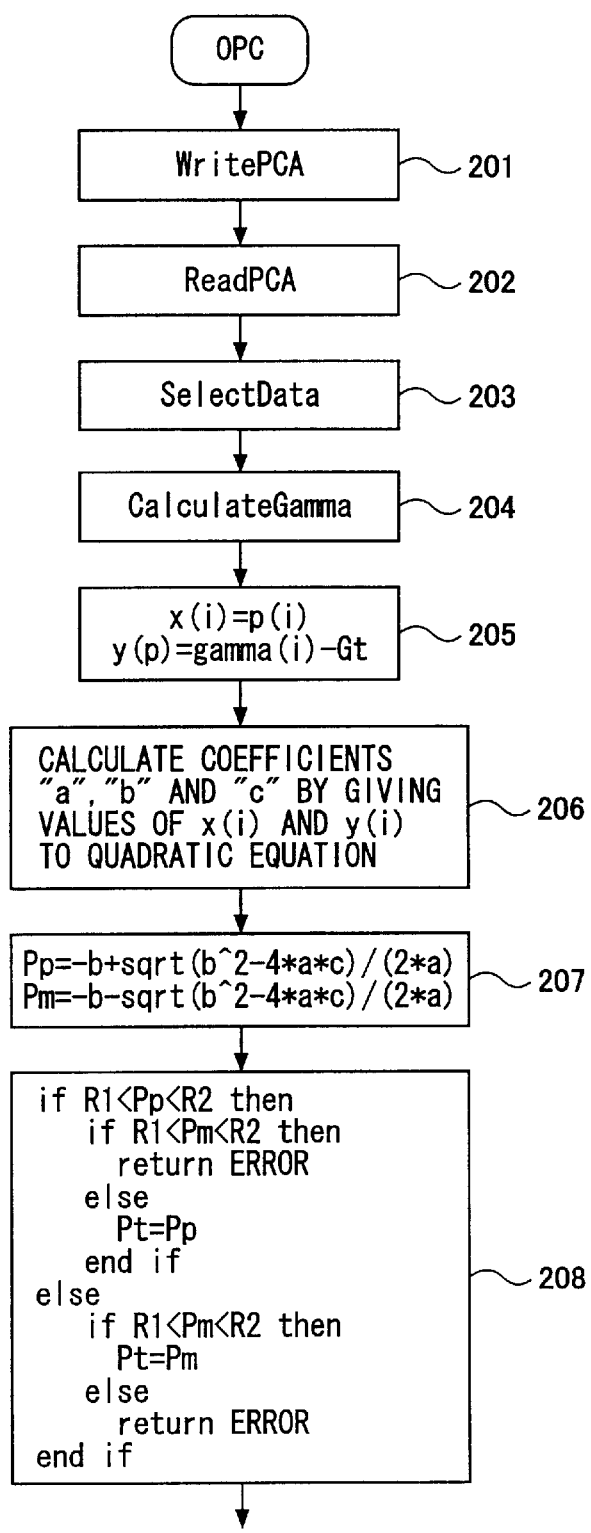
FIG. 2 is a flowchart for explaining a recording power control routine executed by the optical recording/reproducing apparatus of FIG. 1.

FIG. 2 shows a recording power control routine that is executed by the optical recording/reproducing apparatus of FIG. 1.

Hereinafter, the following symbols are used to express calculations in the recording power control routine: "*" denotes a multiplication; "/" denotes a division; "sqrt(x)" denotes a square root of x.

In the recording power control routine of FIG. 2, the controller 108 at step 201 performs a test writing procedure in which recording of a pattern of marks and spaces onto a power calibration area (PCA) of the optical disk 101 with the recording power (indicated by the power signal "p") is repeated by sequentially changing the recording power with increments of a predetermined power. Generally, an optical disk, such as the optical disk 101, is provided with a PCA that is used by a disk drive during a test writing procedure (also called a write-PCA step) to perform a power calibration of the light source or the LD of the optical pickup.

The test writing procedure of step 201 is repeated a given number of times by incrementing the power signal "p", which is supplied to the laser power control unit 109, for each of respective cycles of the test writing. For each of the respective cycles of the test writing, the optical pickup 104 records a test pattern of marks and spaces onto one of sectors of the PCA of the optical disk 101 by focusing the laser beam emitted by the LD of the optical pickup 104 onto the recording layer of the optical disk 104.

Specifically, in the present embodiment, the test writing procedure of step 201 is repeated ten times by sequentially changing the power signal "p", supplied to the laser power control unit 109, from 9.0 mW to 18.0 mW with increments of 1.0 mW, and the corresponding test patterns of marks and spaces are respectively recorded onto the corresponding sectors of the PCA of the optical disk 101 by means of the optical pickup 104.

However, the recording power control routine according to the present invention is not limited to this embodiment. Amy variation or modification may be made to the amount of increments to the write power level, the number of cycles of the test writing/reading, and the portions of the optical disk where the test patterns are written.

After the step 201 is performed, the controller 108 at step 202 performs a test reading procedure (also called a read-PCA step) in which reproducing of the pattern from the PCA of the optical disk 101 is repeated for all of the test patterns that have been recorded onto the PCA of the optical disk 101 at the step 201. A data signal, reproduced from one of the test patterns in the PCA of the optical disk 101, is supplied from the optical pickup 104 to the RF 105, and the data signal is amplified at the RF 105. The P/H 106 detects and holds a peak level of the amplified data signal and outputs a peak-level signal "pk" to the controller 108. The B/H 107 detects and holds a bottom level of the amplified data signal and outputs a bottom-level signal "bt" to the controller 108. Hence, the controller 108 detects the peak-level signal "pk" and the bottom-level signal "bt" for each reproduced data signal.

After the step 202 is performed, the controller 108 at step 203 performs a data selection procedure. In the data selection procedure, the controller 108 calculates a modulation parameter m(i) for each reproduced data signal in accordance with the formula: $m(i)=(pk(i)-bt(i))/pk(i)$ where $i=0$ to 9. In this data selection procedure of step 203, the controller 108 determines whether the modulation parameter of a particular one of the reproduced data signals is necessary for the recording power control, based on the value of each calculated modulation parameter m. Then, the controller 108 selects the necessary data for the recording power control and omits the unnecessary data from the recording power control, which will be described below in greater detail.

The difference (pk−bt) between the peak level and the bottom level of the reproduced data signal is called the reproduced signal amplitude. If the data selection procedure is performed based on the value of the reproduced signal amplitude, the influences of the reflection angles of respective optical disks will not be negligible, and the recording power control will be inaccurate. To avoid this problem, it is desired to carry out the data selection procedure based on the value of the modulation parameter.

Figure 5:
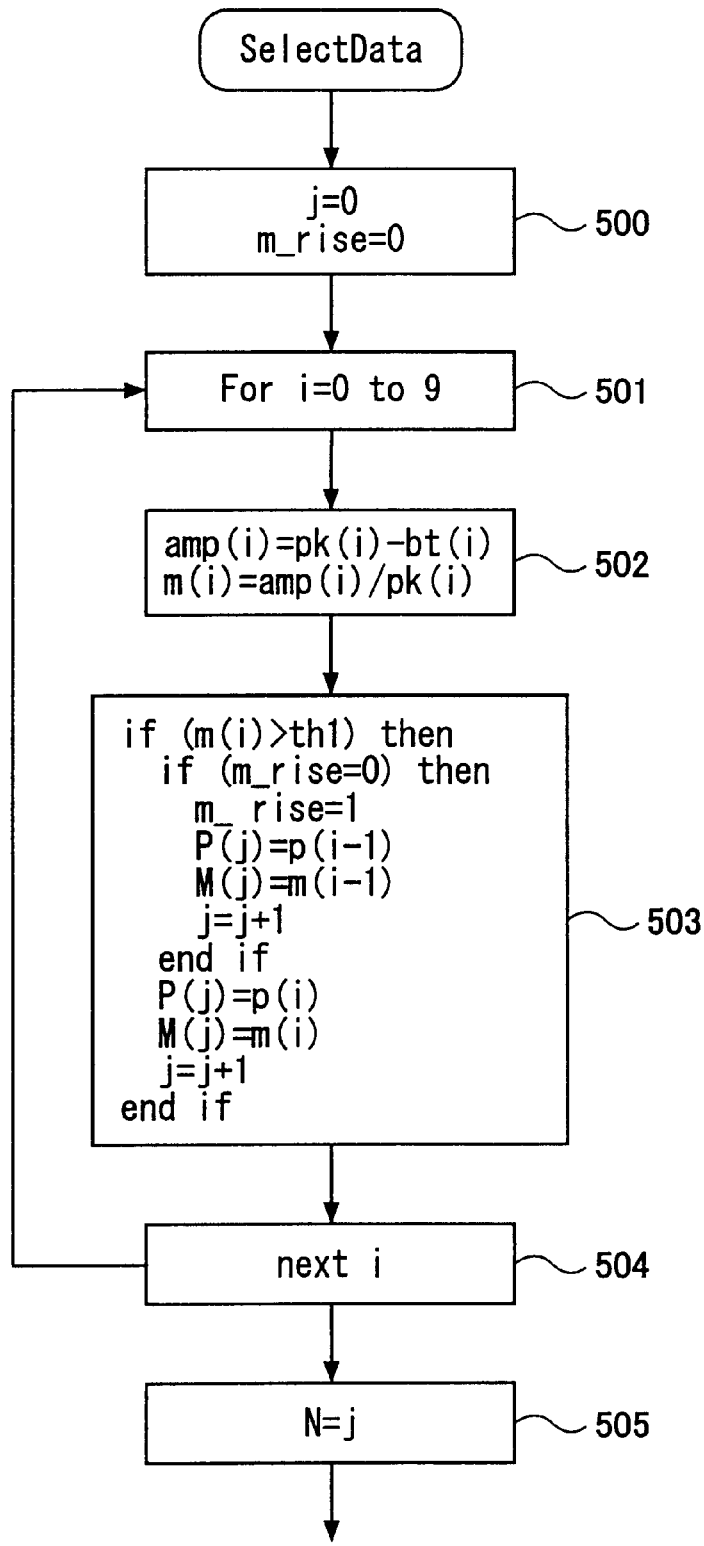
FIG. 5 is a flowchart for explaining a data selection procedure in the recording power control routine of FIG. 2.

FIG. 5 shows a detailed data selection procedure in the recording power control routine of FIG. 2. The data selection procedure of FIG. 5 corresponds to the step 203 of the recording power control routine of FIG. 2.

As shown in FIG. 5, the controller 108 at step 500 resets a data counter "j" to zero and resets a flag "m_rise" to zero. The data counter "j" is incremented every time one of the reproduced data signals is processed. The flag "m_rise" is set to one when a rise of the modulation parameter m occurs (at which the calculated modulation parameter value first exceeds a threshold value), and otherwise it is reset to zero.

The controller 108 at step 501 repeats the data selection procedure for all of the respective reproduced data signals. Specifically, in the present embodiment, the test reading procedure of the step 202 of FIG. 2 is repeated ten times so that ten reproduced data signals are obtained through the test reading of the optical disk 101, and therefore the data selection procedure of FIG. 5 is repeated ten times for all of the respective reproduced data signals.

The controller 108 at step 502 calculates the reproduced signal amplitude amp(i) for one of the reproduced data signals in accordance with the formula: amp(i)=pk(i)−bt(i) where i=0 to 9, and calculates the modulation parameter m(i) for one of the reproduced data signals in accordance with the formula: m(i)=amp(i)/pk(i) where i=0 to 9. In this manner, the controller 108 at step 502 obtains the values of m(i) and p(i) for one of the reproduced data signals, and these values will form the basis for the data selection for the recording power control.

The controller 108 at step 503 selects the values of the present modulation parameter m(i) and the present power signal p(i) for the recording power control if the value of the present modulation parameter m(i) is larger than a threshold value "th1". The controller at step 503 selects the values of the preceding modulation parameter m(i−1) and the preceding power signal p(i−1) for the recording power control if the value of the present modulation parameter m(i) first exceeds the threshold value "th1". Otherwise the controller 108 omits the values of m(i) and p(i) from the recording power control.

Further, in the step 503, the controller 108 assigns the selected value of m(i) and the selected value of p(i) to a variable M(j) and a variable P(j), respectively. The variables M(j) and P(j) are used to indicate the selected data [m(i), p(i)] for the recording power control. The data counter "j" is incremented (j=j+1) after the substitution of the selected data into the variables M(j) and P(j) for one of the reproduced data signals is completed.

The controller at step 504 increments the "i" (i=i+1). The control of the controller 108 is transferred to the above step 501. The above steps 502 and 503 are repeated for all of the reproduced data signals. When the data selection for all of the reproduced data signals is completed, the controller 108 at step 505 assigns the value of the data counter "j" to a variable N (N=j). The data selection procedure of the step 203 in the recording power control routine of FIG. 2 ends, and the control of the controller 108 is transferred to the next step 204.

Figure 7:
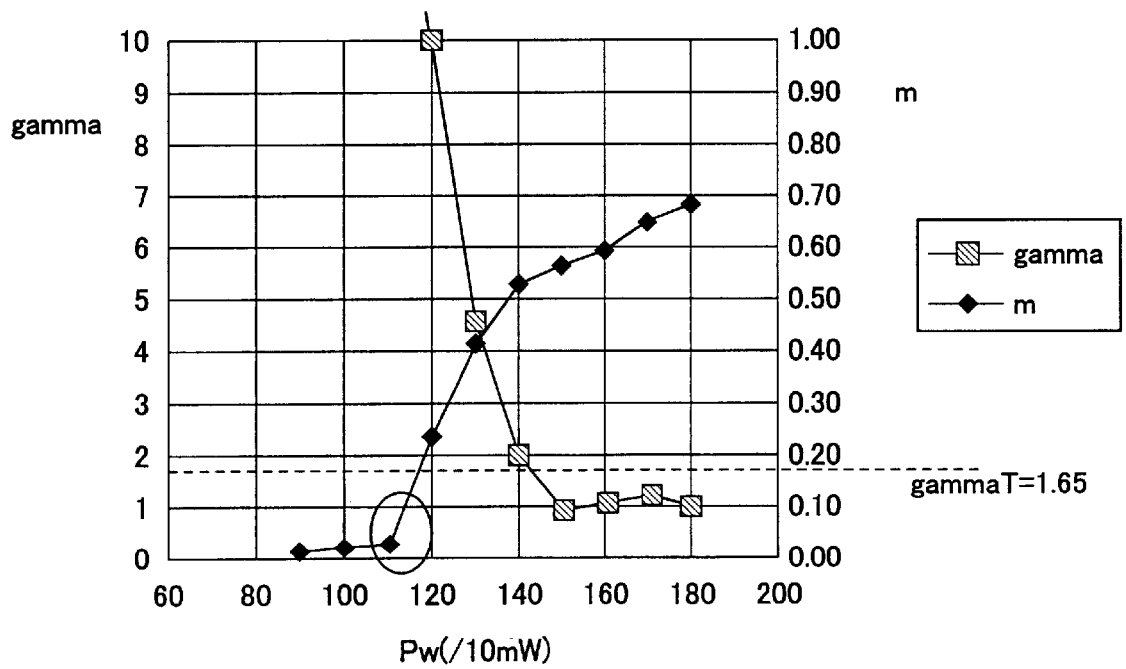
FIG. 7 is a diagram showing an example of selected data that are derived from the data selection procedure of FIG. 5.

FIG. 7 shows an example of the selected data that are derived from the data selection procedure of FIG. 5.

In FIG. 7, the horizontal axis indicates the recording power (or write power) "Pw" that is equivalent to the power signal "p", and the point at 100 in the horizontal scale corresponds to 10.0 mW. In FIG. 7, the vertical axis (on the left side) indicates the modulation parameter "m" that corresponds to the value of the calculated modulation parameter m(i). In the example of FIG. 7, the threshold value "th1" used in the data selection procedure of FIG. 5 is equal to 0.2 (th1=0.2). The power signal "p" (or the write power Pw) is sequentially changed from 9.0 mW to 18.0 mW with increments of 1.0 mW during the test writing procedure of the step 201 of FIG. 2.

In the example of FIG. 7, among the data for all of the ten reproduced data signals, the value of the modulation parameter m(i) for the write power Pw=120 (or 12.0 mW) first exceeds the threshold value "th1" (=0.2). Hence, the controller 108 selects the values of the preceding modulation parameter m(i−1) and the preceding power signal p(i−1) (=11.0 mW; Pw=110) for the recording power control as in the example of FIG. 7. The selection of this data is illustrated by the circle in FIG. 7.

Further, in the example of FIG. 7, the vertical axis (on the right side) indicates the gamma (=(Δm/m)/(Δp/p)) that defines the ratio of a change of the modulation parameter m, normalized by the present modulation parameter value, to a change of the power signal p, normalized by the present power signal value. In the example of FIG. 7, a target gamma "gammaT" that is a target value of the gamma(i) is equal to 1.65. In the example of FIG. 7, the values of the gamma with respect to the respective selected data, which are calculated by the controller 108 in step 204, are illustrated, which will be described later.

Referring back to FIG. 2, after the step 203 is performed, the controller 108 at step 204 performs a gamma calculation procedure.

Figure 6:
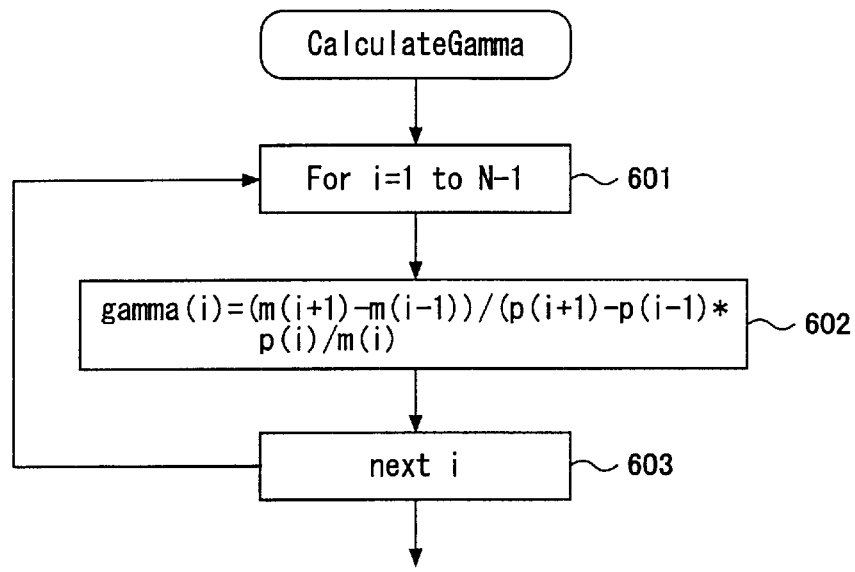
FIG. 6 is a flowchart for explaining a gamma calculation procedure in the recording power control routine of FIG. 2.

FIG. 6 shows a detailed gamma calculation procedure in the recording power control routine of FIG. 2. The procedure of FIG. 6 corresponds to the step 204 in the recording power control routine of FIG. 2.

As shown in FIG. 6, the controller 108 at step 601 repeats the gamma calculation procedure for all of the respective selected data that are obtained in the step 203 of FIG. 2. The "N" in the present embodiment is the same as the value of the variable N obtained in the step 505 of FIG. 5. The variables M(j) and P(j) that are used in the step 503 of FIG. 5 are rewritten into the selected data [m(i), p(i)] in the gamma calculation procedure of FIG. 6.

The controller 108 at step 602 calculates a gamma(i) for one of the selected data in accordance with the formula:

$$\text{gamma}(i)=(m(i+1)-m(i-1))/(p(i+1)-p(i-1))*p(i)$$

where $i=1$ to $N-1$

In the present embodiment, the gamma(i) is actually calculated as in the above formula, by using the values of the preceding power signal p(i−1), the present power signal p(i) and the following power signal p(i+1) as well as the values of the preceding modulation parameter m(i−1), the present modulation parameter m(i) and the following modulation parameter m(i+1). For this reason, the gamma(i) for the selected endpoint data that corresponds to the power signal p(i)=11.0 mW (Pw=110) in the example of FIG. 7 cannot be calculated. When the value of the modulation parameter m for the write power Pw=110 (11.0 mW) is selected as in the example of FIG. 7, the gamma(i) corresponding to the write power Pw=120 (12.0 mW) can be calculated by the above formula and obtained in the memory of the controller 108.

After the step 602 is performed, the controller 108 at step 603 increments the "i" (i=i+1). The control of the controller 108 is then transferred to the above step 601. The above step 602 is repeated for all of the selected data. When the gamma calculation for all of the selected data (i=1 to (N−1)) is completed, the gamma calculation procedure of the step 204 ends, and the control of the controller 108 is then transferred to the next step 205 in the recording power control routine of FIG. 2.

As shown in FIG. 2, the controller 108 at step 205 assigns the value of p(i) to a variable x(i) and assigns the value of (gamma(i)−Gt) (where Gt denotes a known target value of the gamma(i) specific to the optical disk 101 and it is called the target gamma) to a variable y(p). It is supposed that the function (gamma(i)−Gt) is approximated into a continuous function y(p) of the recording power p (for example, in the quadratic form). Hence, in order to determine the optimum recording power, it is necessary to find a solution (a target value of the recording power p) when the continuous function y(p) meets the condition: gamma=Gt. This solution is called "$p_{13}$ target". In order to find the solution "$p_{13}$ target", it is necessary to solve the quadratic equation $y(x)=a*x^2+b*x+c=0$ (or the continuous function y(p)=gamma(i)−Gt=0).

After the step 205 is performed, the controller 108 at step 206 performs a quadratic regression calculation based on the respective values of x(i) and y(i), so that the coefficients "a", "b" and "c" of the quadratic equation: $a*x^2+b*x+c=0$ are calculated through the quadratic regression calculation. Once the coefficients "a", "b" and "c" are determined, it is possible to find the solutions of the quadratic equation: $a*x^2+b*x+c=0$ (that is, the condition: gamma=Gt is met). These solutions are represented by Pp and Pm, and they are also called the roots of the quadratic equation. One of the two solutions Pp and Pm will be the p_target, or the optimum recording power.

After the step 206 is performed, the controller 108 at step 207 calculates the solutions Pp and Pm of the quadratic equation in accordance with the following formulas.

$$Pp=(-b+\mathrm{sqrt}(b^2-4*a*c))/(2*a)$$

$$Pm=(-b-\mathrm{sqrt}(b^2-4*a*c))/(2*a)$$

After the step 207 is performed, the controller 108 at step 208 finds proper one of the solutions Pp and Pm that are obtained in the step 207, and assigns the value of the proper one of the solutions Pp and Pm to a variable Pt that indicates the "p_target", or the optimum recording power.

Specifically, in the step 208, if only one of the solutions Pp and Pm falls within a given range between a lower limit recording power R1 and an upper limit recording power R2, then the controller 108 determines that the only one solution is a proper solution, and assigns the value of the solution to the variable Pt. If both the solutions Pp and Pm fall within the given range between the R1 and the R2, the controller 108 determines that an error takes place, and the control of the controller 108 is transferred to an error routine (not shown). If both the solutions Pp and Pm do not fall within the given range between the R1 and the R2, the controller 108 determines that an error takes place, and the control of the controller 108 is transferred to the error routine.

In the error routine, any of various conceivable measures may be taken, including the restart of the recording power control routine of FIG. 2, the selection of a fixed recording power as the optimum recording power, and the ejection of the optical disk 101 out of the optical recording/reproducing apparatus of FIG. 1.

In the step 208, an error may take place due to the use of an improper optical disk, a malfunction of the hardware or the presence of a defect in the PCA of the optical disk. After the step 208 is performed, unless any error takes place, the controller 108 can provide the value of the variable Pt as the value indicating the optimum recording power.

In the above-described embodiment, the recording power control algorithm accurately checks the rising slope of the modulation parameter related to the reproduced data signal, and the optical recording/reproducing method and apparatus of the present invention are effective in minimizing variations of the optimum recording power through the recording power control algorithm and in accurately producing the optimum recording power without being affected by noise. As the selection of an improper recording power can be safely prevented, the optical recording/reproducing method and apparatus of the present invention can provide good recording characteristics and protect the light source of the optical pickup and the recording layer of the optical disk against damage.

Figure 3:
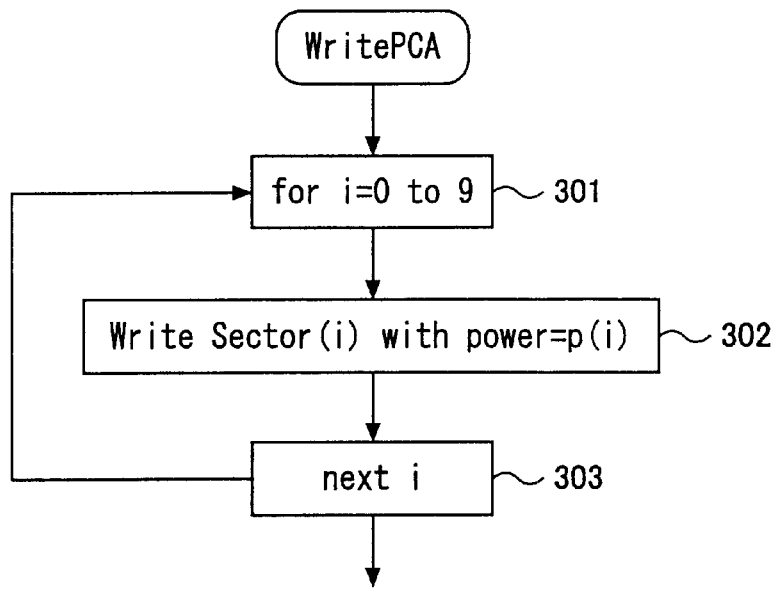
FIG. 3 is a flowchart for explaining a test writing procedure in the recording power control routine of FIG. 2.

FIG. 3 shows a detailed test writing procedure in the recording power control routine of FIG. 2. The procedure of FIG. 3 corresponds to the step 201 in the recording power control routine of FIG. 2.

As shown in FIG. 3, in the present embodiment, the test writing procedure is repeated ten times by sequentially changing the power signal "p(i)", supplied to the laser power control unit 109, from 9.0 mW to 18.0 mW with increments of 1.0 mW, and the corresponding test patterns of marks and spaces are respectively written to the corresponding sectors (i) of the PCA of the optical disk 101 with the recording powers p(i), by controlling the optical pickup 104.

Figure 4:
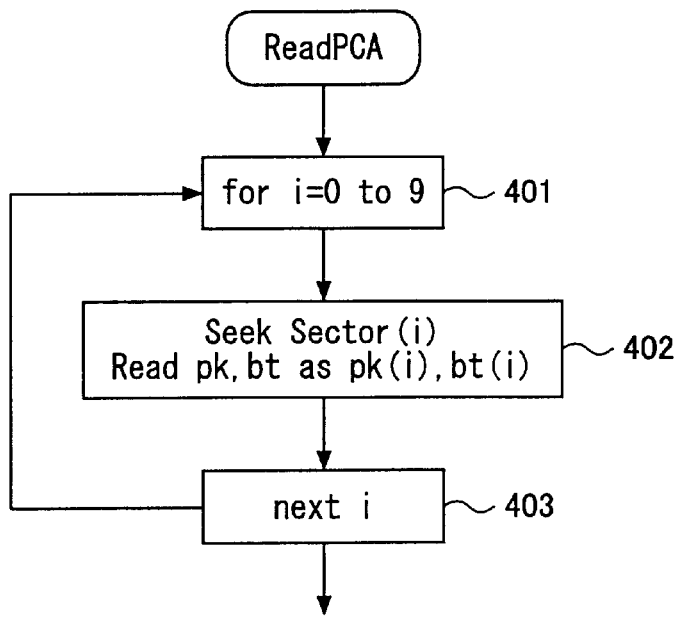
FIG. 4 is a flowchart for explaining a test reading procedure in the recording power control routine of FIG. 2.

FIG. 4 shows a detailed test reading procedure in the recording power control routine of FIG. 2. The procedure of FIG. 4 corresponds to the step 202 in the recording power control routine of FIG. 2.

As shown in FIG. 4, in the present embodiment, the test reading procedure (or the seek operation) is repeated ten times by controlling the optical pickup 104 to read the corresponding sectors (i) of the PCA of the optical disk 101 where the test writing procedure is performed at the step 201. The reproduced data signal, derived from each of the test patterns in the corresponding sectors (i) of the PCA of the optical disk 101, is supplied from the optical pickup 104 to the RF 105, and the data signal is amplified at the RF 105. The P/H 106 detects and holds a peak level of the amplified data signal and outputs a peak-level signal "pk" to the controller 108. The B/H 107 detects and holds a bottom level of the amplified data signal and outputs a bottom-level signal "bt" to the controller 108. In this manner, the controller 108 detects the peak-level signal "pk" and the bottom-level signal "bt" for each reproduced data signal, and assigns the detected values pk and bt to the variables pk(i) and bt(i), respectively.

In the above-described embodiment, the recording power control algorithm accurately checks the rising slope of the modulation parameter related to the reproduced data signal, and the optical recording/reproducing method and apparatus of the present embodiment are effective in minimizing variations of the optimum recording power through the recording power control algorithm and in accurately determining the optimum recording power without being affected by noise. As the selection of an improper recording power can be safely prevented, the optical recording/reproducing method and apparatus of the present embodiment can provide good recording characteristics and protect the light source of the optical pickup and the recording layer of the optical disk against damage.

Figures 8, 9:
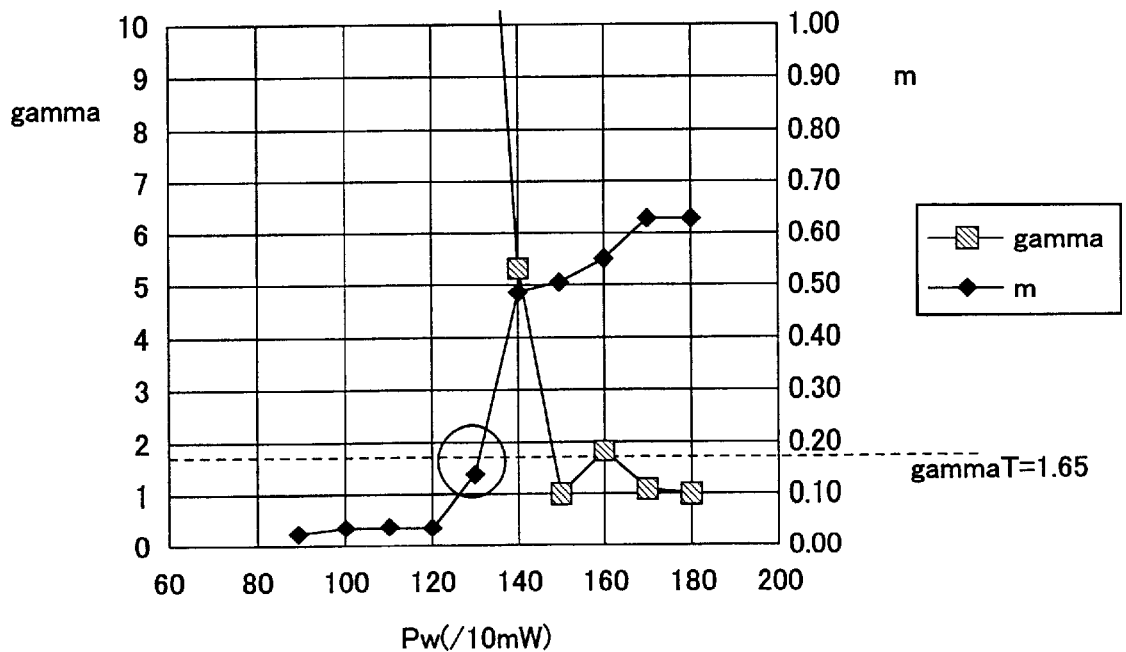
FIG. 8 is a diagram for explaining an alternative data selection procedure in the recording power control routine of FIG. 2.
FIG. 9 is a diagram showing an example of selected data that are derived from the data selection procedure of FIG. 8.

FIG. 8 shows an alternative data selection procedure in the recording power control routine of FIG. 2.

In the present embodiment, the procedure (step 503A) of FIG. 8 is substituted for the step 503 in the data selection procedure of FIG. 5, and such alternative data selection procedure corresponds to the step 203 in the recording power control routine of FIG. 2.

As shown in FIG. 8, in the present embodiment, the controller 108 at step 503A selects the values of the present modulation parameter m(i) and the present power signal p(i) for the recording power control if the value of the present modulation parameter m(i) is larger than a threshold value "th1". The controller at step 503A selects the values of the preceding modulation parameter m(i−1) and the preceding power signal p(i−1) for the recording power control if the value of the present modulation parameter m(i) first exceeds the threshold value "th1" and is larger than a second threshold vale th2 (th2>th1 ). Otherwise the controller 108 omits the values of m(i) and p(i) from the recording power control.

Further, in the step 503A, the controller 108 assigns the selected value of m(i) and the selected value of p(i) to the variable M(j) and the variable P(j), respectively. The variables M(j) and P(j) are used to indicate the selected data [m(i), p(i)] for the recording power control. The data counter "j" is incremented (j=j+1) after the substitution of the selected data into the variables M(j) and P(j) for one of the reproduced data signals is completed.

FIG. 9 shows an example of selected data that are derived from the data selection procedure of FIG. 8.

In FIG. 9, the horizontal axis indicates the recording power (or write power) "Pw" that is equivalent to the power signal "p", and the point at 100 in the horizontal scale corresponds to 10.0 mW. In FIG. 9, the vertical axis (on the left side) indicates the modulation parameter "m" that corresponds to the value of the calculated modulation parameter m(i). In the example of FIG. 9, the threshold value "th1" and "th2" used in the data selection procedure of FIG. 8 are respectively equal to 0.2 and 0.3 (th1=0.2, th2=0.3). The power signal "p" (or the write power Pw) is sequentially changed from 9.0 mW to 18.0 mW with increments of 1.0 mW during the test writing procedure of the step 201 of FIG. 2.

In the example of FIG. 9, among the data for all of the ten reproduced data signals, the value of the modulation parameter m(i) for the write power Pw=140 (or 14.0 mW) first exceeds the threshold value "th1" (=0.2) and is larger than the second threshold value "th2" (=0.3). Hence, the controller 108 selects the values of the preceding modulation parameter m(i−1) and the preceding power signal p(i−1) (=13.0 mW; Pw=130) for the recording power control as in the example of FIG. 9. The selection of this data is illustrated by the circle in FIG. 9.

In the previous example of FIG. 7, the value of m(i) for the write power Pw=120 (or 12.0 mW) first exceeds the threshold value "th1" (=0.2). The values of the preceding modulation parameter m(i−1) and the preceding power signal p(i−1) (=11.0 mW; Pw=110) are selected for the recording power control. However, there is the possibility that the value of m(i) is not sufficiently larger than the threshold value "th1", and the value of m(i−1) is too small to be selected for the recording power control. In such a case, the reliability in determining the optimum recording power will be lowered.

According to the above embodiment of FIG. 8, the recording power control algorithm more accurately checks the rising slope of the modulation parameter related to the reproduced data signal, and the optical recording/reproducing method and apparatus of the present embodiment are more effective in minimizing variations of the optimum recording power through the recording power control algorithm. It is possible to more accurately determine the optimum recording power without being affected by noise.

Further, in the example of FIG. 9, the vertical axis (on the right side) indicates the gamma (=(Δm/m)/(Δp/p)) that defines the ratio of a change of the modulation parameter m, normalized by the present modulation parameter value, to a change of the power signal p, normalized by the present power signal value. In the example of FIG. 9, a target gamma "gammaT" that is a target value of the gamma(i) is equal to 1.65. In the example of FIG. 9, the values of the gamma with respect to the respective selected data are calculated by the controller 108 in the step 204, and they are illustrated in FIG. 9.

Figure 10:
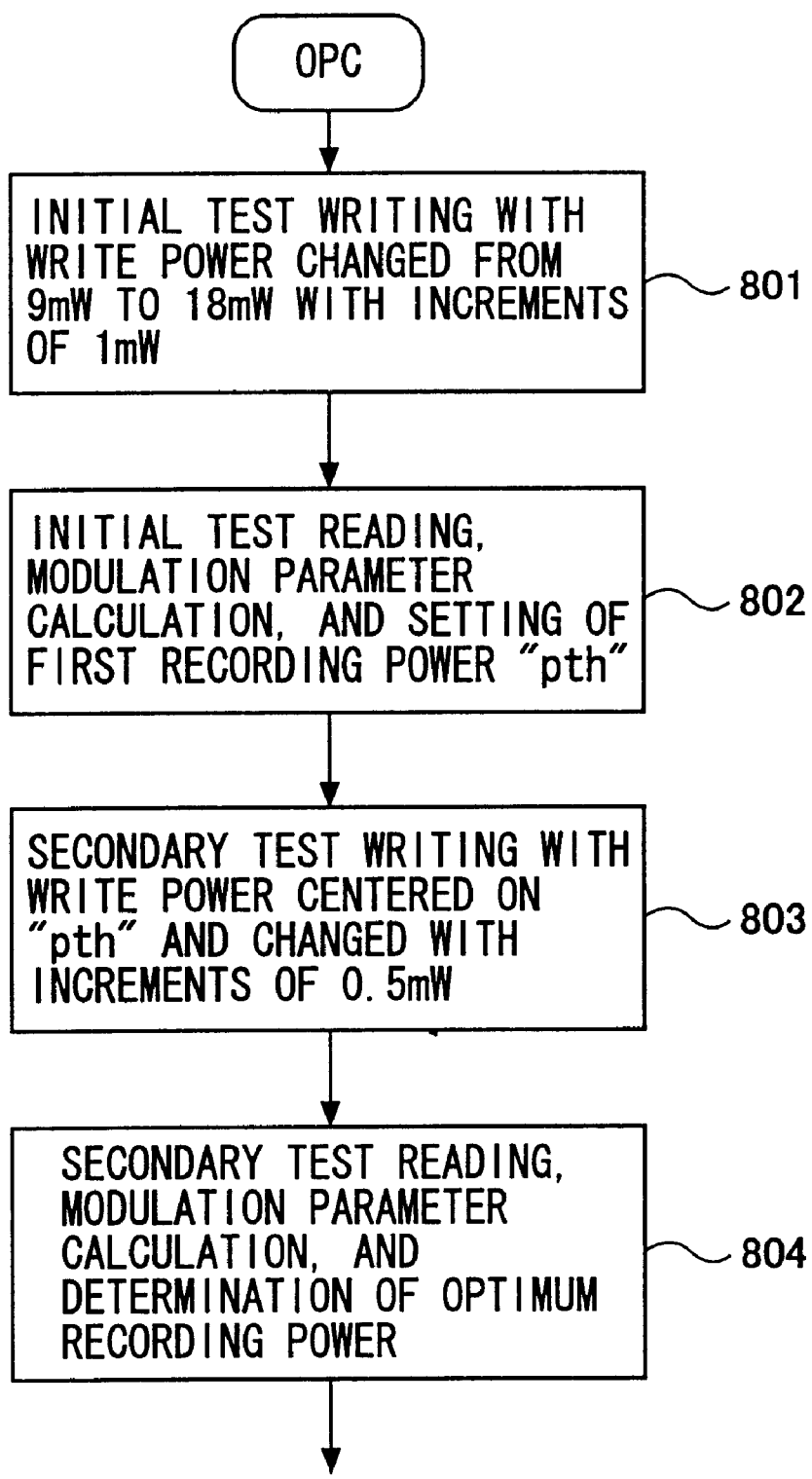
FIG. 10 is a flowchart for explaining an alternative recording power control routine executed by the optical recording/reproducing apparatus of FIG. 1.

FIG. 10 shows an alternative recording power control routine that is executed by the optical recording/reproducing apparatus of FIG. 1. In this alternative embodiment, the recording power control routine of FIG. 10 is substituted for the routine of FIG. 2.

As shown in FIG. 10, the controller 108 at step 801 performs an initial test writing in which writing of a pattern of marks and spaces to the power calibration area (PCA) of the optical disk 101 with the recording power (indicated by the power signal "p") is repeated by sequentially changing the recording power with increments of a predetermined power.

The initial test writing of step 801 is repeated a given number of times by incrementing the power signal "p", which is supplied to the laser power control unit 109, for each of respective cycles of the test writing. For each of the respective cycles of the test writing, the optical pickup 104 records a test pattern of marks and spaces onto one of the sectors of the PCA of the optical disk 101 by focusing the laser beam emitted by the LD of the optical pickup 104 onto the recording layer of the optical disk 104.

Specifically, in the present embodiment, the initial test writing of the step 801 is repeated ten times by sequentially changing the power signal "p", supplied to the laser power control unit 109, from 9.0 mW to 18.0 mW with increments of 1.0 mW, and the corresponding test patterns of marks and spaces are respectively recorded onto the corresponding sectors of the PCA of the optical disk 101 by means of the optical pickup 104.

However, the recording power control routine according to the present invention is not limited to this embodiment. Any variation or modification may be made to the amount of increments to the write power level, the number of the cycles of the test writing/reading, and the portions of the optical disk where the test patterns are written.

After the step 801 is performed, the controller 108 at step 802 performs an initial test reading in which reading out the pattern from the PCA of the optical disk 101 is repeated for all of the test patterns that have been recorded onto the PCA of the optical disk 101 at the step 801. A data signal, reproduced from one of the test patterns in the PCA of the optical disk 101, is supplied from the optical pickup 104 to the RF 105, and the data signal is amplified at the RF 105. The P/H 106 detects and holds a peak level of the amplified data signal and outputs a peak-level signal "pk" to the controller 108. The B/H 107 detects and holds a bottom level of the amplified data signal and outputs a bottom-level signal "bt" to the controller 108. Hence, the controller 108 detects the peak-level signal "pk" and the bottom-level signal "bt" for each reproduced data signal.

In the step 802, the controller 108 calculates a reproduced signal amplitude amp(i) for each reproduced data signal in accordance with the formula amp(i)=pk(i)−bt(i) where i=0 to 9, and calculates a modulation parameter m(i) for each reproduced data signal in accordance with the formula: m(i)=(pk(i)−bt(i))/pk(i) where i=0 to 9. The controller 108 sets a first recording power "pth" by finding a pair of the modulation parameter m and the recording power p, from among all of the calculated modulation parameters and the respective recording powers, a value of the modulation parameter m of that pair first exceeding a threshold value "th". This means that the controller 108 initially selects a sequence of pairs of the modulation parameter m and the recording power p in which all of the calculated modulation parameters m(i) are larger than the threshold value "th".

Figure 11:
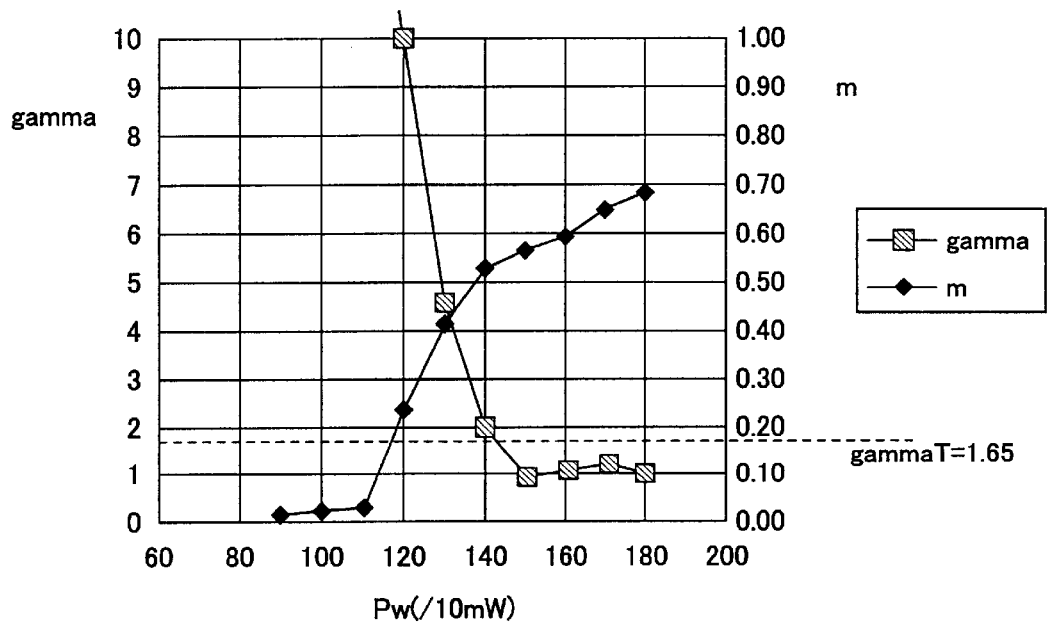
FIG. 11 is a diagram showing an example of selected data that are derived from an initial test writing procedure in the recording power control routine of FIG. 10.

FIG. 11 shows an example of selected data that are derived from the initial test writing procedure in the recording power control routine of FIG. 10.

In FIG. 11, the horizontal axis indicates the recording power "Pw" that is equivalent to the power signal "p", and the point at 100 in the horizontal scale corresponds to 10.0 mW. In FIG. 11, the vertical axis (on the left side) indicates the modulation parameter "m" that corresponds to the value of the calculated modulation parameter m(i). In the example of FIG. 11, the threshold value "th" used in the procedure of FIG. 10 is equal to 0.2 (th=0.2). The power signal "p" (or the recording power Pw) is sequentially changed from 9.0 mW to 18.0 mW with increments of 1.0 mW during the initial test writing of the step 801 of FIG. 10.

In the example of FIG. 11, among the data for all of the ten reproduced data signals, the value of the modulation parameter m(i) for the recording power Pw=120 (or 12.0 mW) first exceeds the threshold value "th" (=0.2). Hence, the controller 108 sets the recording power p(i) (=12.0 mW, or Pw=120) as the first recording power "pth".

Referring back to FIG. 10, the controller 108 at step 803 performs a secondary test writing in which writing of a pattern of marks and spaces to the PCA of the optical disk 101 with the recording power p(i), which is substantially centered on the first recording power "pth", is repeated by sequentially changing the recording power with second, smaller increments of a predetermined power.

The secondary test writing of step 803 is repeated the same number of times by incrementing the power signal "p", which is supplied to the laser power control unit 109, for each of respective cycles of the test writing. For each of the respective cycles of the test writing, the optical pickup 104 records the test pattern of marks and spaces onto one of the sectors of the PCA of the optical disk 101 by focusing the laser beam emitted by the LD of the optical pickup 104 onto the recording layer of the optical disk 104.

Specifically, in the present embodiment, the second test writing of the step 803 is repeated ten times by sequentially changing the power signal "p" (supplied to the laser power control unit 109) from 11.0 mW to 15.5 mW with the second increments of 0.5 mW, and the corresponding test patterns of marks and spaces are respectively recorded onto the corresponding sectors of the PCA of the optical disk 101 by means of the optical pickup 104.

After the step 803 is performed, the controller 108 at step 804 performs a secondary test reading in which reading out the pattern from the PCA of the optical disk 101 is repeated for all of the test patterns that have been recorded onto the PCA of the optical disk 101 at the step 803. A data signal, reproduced from one of the test patterns in the PCA of the optical disk 101, is supplied from the optical pickup 104 to the RF 105, and the data signal is amplified at the RF 105. The P/H 106 detects and holds a peak level of the amplified data signal and outputs a peak-level signal "pk" to the controller 108. The B/H 107 detects and holds a bottom level of the amplified data signal and outputs a bottom-level signal "bt" to the controller 108. Hence, the controller 108 detects the peak-level signal "pk" and the bottom-level signal "bt" for each reproduced data signal.

In the step 804, the controller 108 calculates a modulation parameter m(i) for each reproduced data signal in accordance with the formula: $m(i)=(pk(i)-bt(i))/pk(i)$ where i=0 to 9. The controller 108 selects, from all of the calculated modulation parameter values and the respective recording powers, a sequence of pairs of the modulation parameter m and the recording power p. The controller 108 calculates a gamma ($=(\Delta m/m)/(\Delta p/p)$) for each of the selected pairs of the modulation parameter m and the recording power p, the gamma defining a ratio of a change of the modulation parameter m, normalized by a present modulation parameter value, to a change of the recording power p, normalized by a present recording power value. Further, the controller 108 finds a target recording power (p_target) corresponding to an optimum recording power based on the function (y(p)= gamma(i)−Gt; Gt: target gamma) derived from the relationship between the calculated gamma values and the respective recording powers, the target recording power causing a value of the function to be equal to zero. This means that the controller 108 in the step 804 performs procedures that are essentially the same as the steps 202 through 208 in the recording power control routine of FIG. 2, in order to determine the optimum recording power based on the relationship between the modulation parameters and the respective recording powers.

In the selecting procedure of the step 804, the controller 108 selects the values of the present modulation parameter m(i) and the present power signal p(i) for the recording power control if the value of the present modulation parameter m(i) is larger than a threshold value "th3". The controller selects the values of the preceding modulation parameter m(i−1) and the preceding power signal p(i−1) for the recording power control if the value of the present modulation parameter m(i) first exceeds the threshold value "th3". Otherwise the controller 108 omits the values of m(i) and p(i) from the recording power control. This procedure is essentially the same as the step 503 of FIG. 5 in the previous embodiment.

Alternatively, in the selecting procedure of the step 804, the controller 108 selects the values of the present modulation parameter m(i) and the present power signal p(i) for the recording power control if the value of the present modulation parameter m(i) is larger than a threshold value "th3". The controller selects the values of the preceding modulation parameter m(i−1) and the preceding power signal p(i−1) for the recording power control if the value of the present modulation parameter m(i) first exceeds the threshold value "th3" and is larger than a second threshold value "th4" (th4>th3). Otherwise the controller 108 omits the values of m(i) and p(i) from the recording power control. This procedure is essentially the same as the step 503A of FIG. 8 in the previous embodiment.

Figure 12:
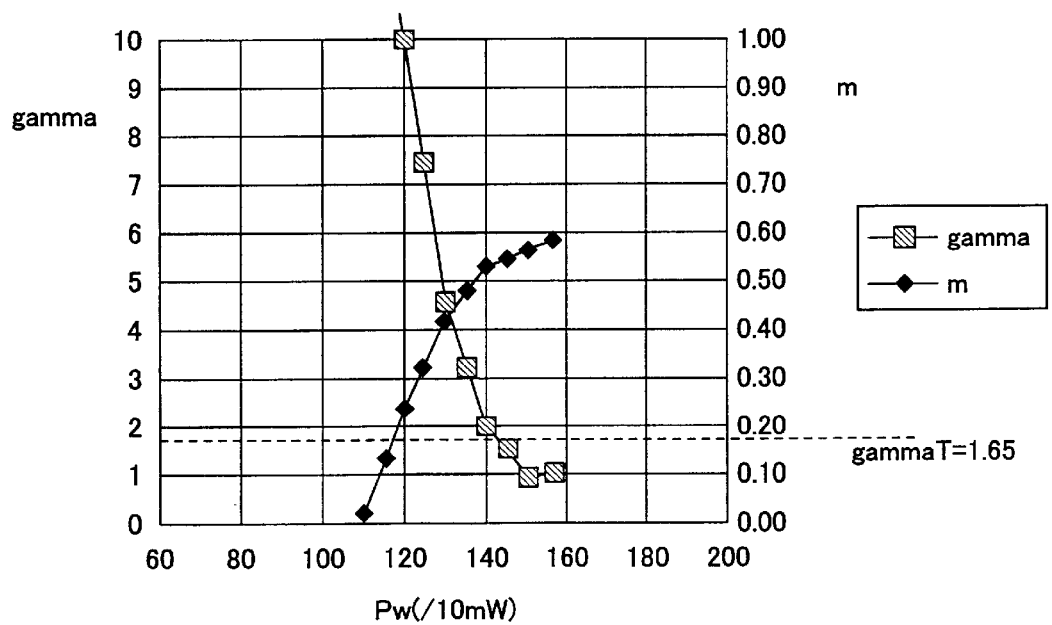
FIG. 12 is a diagram showing an example of selected data that are derived from a secondary test writing procedure in the recording power control routine of FIG. 10.

FIG. 12 shows an example of selected data that are derived from the secondary test writing procedure in the recording power control routine of FIG. 10.

In FIG. 12, the horizontal axis indicates the recording power "Pw" that is equivalent to the power signal "p", and the point at 100 in the horizontal scale corresponds to 10.0 mW. In FIG. 12, the vertical axis (on the left side) indicates the modulation parameter "m" that corresponds to the value of the calculated modulation parameter m(i). In the example of FIG. 12, the threshold values "th3" and "th4" used in the procedure of FIG. 10 are respectively equal to 0.2 and 0.3 (th3=0.2, th4=0.3). The power signal "p" (or the recording power Pw) is sequentially changed from 11.0 mW to 15.5 mW with the second increments of 0.5 mW during the secondary test writing of the step 803 of FIG. 10.

In the example of FIG. 12, among the data for all of the ten reproduced data signals, the value of the modulation parameter m(i) for the recording power Pw=120 (or 12.0 mW) first exceeds the threshold value "th3" (=0.2) but is not larger than the second threshold value "th4" (=0.3). In this case, the controller 108 selects the pair of the modulation parameter m(i) and the recording power p(i) (=12.0 mW), but does not select (or omits) the pair of the modulation parameter m(i−1) and the recording power p(i−1) (=11.5 mW).

According to the above embodiment of FIG. 10, the recording power control algorithm more accurately checks the rising slope of the modulation parameter related to the reproduced data signal, and the optical recording/reproducing method and apparatus of the present embodiment are more effective in minimizing variations of the optimum recording power through the recording power control algorithm. It is possible to more accurately determine the optimum recording power without being affected by noise.

In the above-described embodiments of FIG. 1 through FIG. 12, the gamma (=(Δm/m)/(Δp/p)) is approximated into a continuous function of the recording power p, and the target recording power (p_target), which corresponds to the optimum recording power, is determined based on the continuous function of the recording power p. Even when there are variations in the modulation parameter calculations based on the reproduced data signals, it is possible to accurately determine the optimum recording power because of the approximation using the continuous function.

Figure 13:
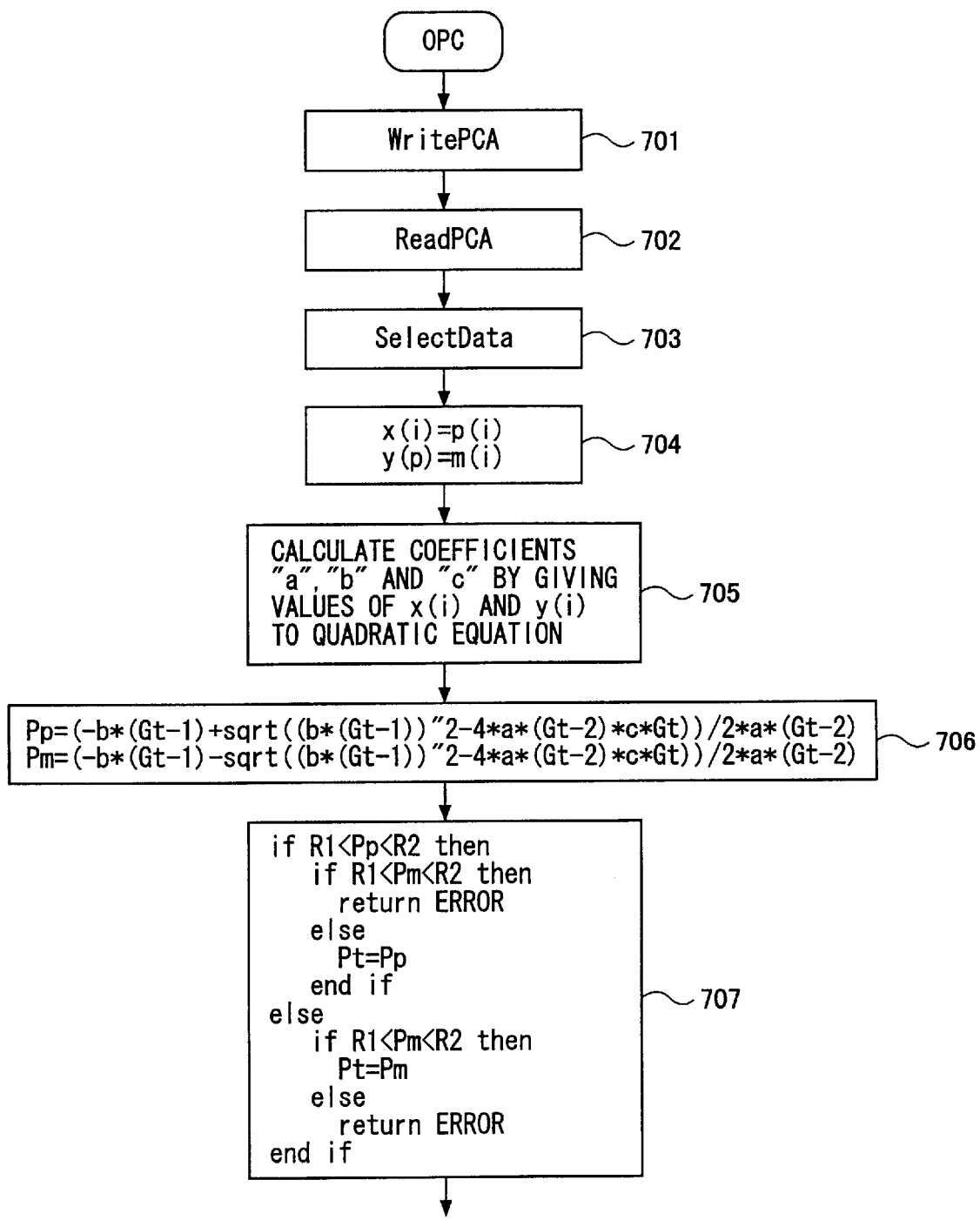
FIG. 13 is a flowchart for explaining an alternative recording power control routine executed by the optical recording/reproducing apparatus of FIG. 1.

Next, FIG. 13 shows an alternative recording power control routine that is executed by the optical recording/reproducing apparatus of FIG. 1.

In this alternative embodiment, the recording power control routine of FIG. 13 is substituted for the recording power control routine of FIG. 2. As described above, in the previous embodiments, the gamma is approximated into a continuous function of the recording power p. In the present embodiment, the modulation parameter m is approximated into a continuous function of the recording power p.

As shown in FIG. 13, the controller 108 at steps 701 through 703 performs procedures that are essentially the same as the steps 201 through 203 in the routine of FIG. 2, and a description thereof will be omitted for the sake of convenience.

In the routine of FIG. 13, after the step 703 is performed, the controller 108 at step 704 assigns the value of p(i) to a variable x(i) and assigns the value of the modulation parameter m(i) to a variable y(p). It is supposed that the function of the modulation parameter m(i) is approximated into a continuous function y(p) of the recording power p (e.g., in the quadratic form). Hence, in order to determine the optimum recording power, it is necessary to find a solution (a target value of the recording power p) when the continuous function y(p) meets the condition: gamma=Gt. "Gt" denotes a known target value of the gamma(i) specific to the optical disk 101 and it is called the target gamma. This solution is called "$p_{13}$ target". In order to find the solution "$p_{13}$ target", it is necessary to solve the quadratic equation $y(x)=a*x^2+b*x+c=0$.

After the step 704 is performed, the controller 108 at step 705 performs a quadratic regression calculation based on the respective values of x(i) and y(i), so that the coefficients "a", "b" and "c" of the quadratic equation: $a*x^2+b*x+c=0$ are calculated through the quadratic regression calculation. Once the coefficients "a", "b" and "c" are determined, it is possible to find the solutions of the quadratic equation: $a*x^2+b*x+c=0$ (that is, the condition: gamma=Gt is met). These solutions are represented by Pp and Pm, and they are also called the roots of the quadratic equation. One of the two solutions Pp and Pm will be the p_target, or the optimum recording power.

After the step 705 is performed, the controller 108 at step 706 calculates the solutions Pp and Pm of the quadratic equation in accordance with the following formulas.

$$Pp=(-b*(Gt-1)+\text{sqrt}((b*(Gt-1))^2-4*a*(Gt-2)*c*Gt))/2*a*(Gt-2) \quad (1a)$$

$$Pm=(-b*(Gt-1)-\text{sqrt}((b*(Gt-1))^2-4*a*(Gt-2)*c*Gt))/2*a*(Gt-2) \quad (1b)$$

After the step 706 is performed, the controller 108 at step 707 finds proper one of the solutions Pp and Pm that are obtained in the step 706, and assigns the value of the proper one of the solutions Pp and Pm to the variable Pt that indicates the "p_target", or the optimum recording power.

Specifically, in the step 707, if only one of the solutions Pp and Pm falls within a given range between a lower limit recording power R1 and an upper limit recording power R2, then the controller 108 determines that the only one solution is a proper solution, and assigns the value of the solution to the variable Pt. If both the solutions Pp and Pm fall within the given range between the R1 and the R2, the controller 108 determines that an error takes place, and the control of the controller 108 is transferred to an error routine (not shown). If both the solutions Pp and Pm do not fall within the given range between the R1 and the R2, the controller 108 determines that an error takes place, and the control of the controller 108 is transferred to the error routine.

In the error routine, any of various conceivable measures may be taken, including the restart of the recording power control routine of FIG. 13, the selection of a fixed recording power as the optimum recording power, and the ejection of the optical disk 101 out of the optical recording/reproducing apparatus of FIG. 1.

In the step 707, an error may take place due to the use of an improper optical disk, a malfunction of the hardware or the presence of a defect in the PCA of the optical disk. After the step 707 is performed, unless any error takes place, the controller 108 can provide the value of the variable Pt as the value indicating the optimum recording power.

The above formulas (1a) and (1b), used in the step 706, are derived as follows. It is supposed that the function of the modulation parameter m(i) is approximated into a continuous quadratic-form function y(p) of the recording power p. In order to determine the optimum recording power, it is necessary to find a solution (a target value of the recording power p) of the quadratic equation when the continuous function y(p) meets the condition: gamma=Gt. In order to find the solution "p_target", it is necessary to solve the quadratic equation $y(x)=a*x^2+b*x+c=0$.

The normalized gradient "gamma" is represented by $(dm/dp)*(p/m)$, and when the condition: gamma=Gt is met, $(dm/dp)*(p/m)=Gt$. Based on the above approximation, the modulation parameter m is written into the continuous, quadratic-form function of the recording power p, namely, $m=a*p^2+b*p+c$. As $(dm/dp)$ is a gradient function of the modulation parameter p with respect to the recording power p, $dm/dp=2*a*p+b$. Therefore, the equation $(dm/dp)*(p/m)=Gt$ is as follows, $$\text{gamma}=(2*a*p+b)*(p/(a*p^2+b*p+c))=Gt \quad (2)$$

From the above equation, the following quadratic equation is obtained, $$a*(Gt-2)*p^2+b*(Gt-1)*p+c*Gt=0$$

The solutions of the above quadratic equation yield the above formulas (1a) and (1b).

In the above-described embodiment, the continuous function of the recording power p is derived from the approximation of the modulation parameter "m", rather than from the approximation of the normalized gradient "gamma". The recording power control algorithm accurately checks the rising slope of the modulation parameter related to the reproduced data signal, and the optical recording/reproducing method and apparatus of the present invention are effective in minimizing variations of the optimum recording power through the recording power control algorithm and in accurately producing the optimum recording power without being affected by noise. As the selection of an improper recording power can be safely prevented, the optical recording/reproducing method and apparatus of the present invention can provide good recording characteristics and protect the light source of the optical pickup and the recording layer of the optical disk against damage.

In another preferred embodiment of the present invention, the procedure (the step 503A) of FIG. 8 is substituted for the step 503 in the data selection procedure of FIG. 5, and such alternative data selection procedure is substituted for the step 703 in the recording power control routine of FIG. 13. The steps of the recording power control routine in the present embodiment are essentially the same as the corresponding steps in the previous embodiments of FIG. 1 through FIG. 12, and a description thereof will be omitted.

According to the above preferred embodiment, the continuous function of the recording power p is derived from the approximation of the modulation parameter "m". The recording power control algorithm accurately checks the rising slope of the modulation parameter related to the reproduced data signal, and the optical recording/reproducing method and apparatus of the present invention are effective in minimizing variations of the optimum recording power through the recording power control algorithm and in accurately producing the optimum recording power without being affected by noise. As the selection of an improper recording power can be safely prevented, the optical recording/reproducing method and apparatus of the present invention can provide good recording characteristics and protect the light source of the optical pickup and the recording layer of the optical disk against damage.

In another preferred embodiment of the present invention, the modulation-parameter-based calculation procedure (the step 706) in the recording power control routine of FIG. 13 is substituted for the gamma-based calculation procedure of the step 804 in the recording power control routine of FIG. 10. The steps of the recording power control routine in the present embodiment are essentially the same as the corresponding steps in the above embodiments of FIG. 10 and FIG. 13, and a description thereof will be omitted.

According to the above preferred embodiment, the continuous function of the recording power p is derived from the approximation of the modulation parameter "m". The recording power control algorithm accurately checks the rising slope of the modulation parameter related to the reproduced data signal, and the optical recording/reproducing method and apparatus of the present invention are effective in minimizing variations of the optimum recording power through the recording power control algorithm and in accurately producing the optimum recording power without being affected by noise. As the selection of an improper recording power can be safely prevented, the optical recording/reproducing method and apparatus of the present invention can provide good recording characteristics and protect the light source of the optical pickup and the recording layer of the optical disk against damage.

In another preferred embodiment of the present invention, the procedure (the step 503A) of FIG. 8 is substituted for the step 503 in the data selection procedure of FIG. 5, and such alternative data selection procedure is substituted for the data selection procedure of the step 804 in the recording power control routine of FIG. 10. Further, the modulation-parameter-based calculation procedure (the step 706) in the recording power control routine of FIG. 13 is substituted for the gamma-based calculation procedure of the step 804 in the recording power control routine of FIG. 10. The steps of the recording power control routine in the present embodiment are essentially the same as the corresponding steps in the previous embodiments of FIG. 1 through FIG. 13, and a description thereof will be omitted.

According to the above preferred embodiment, the continuous function of the recording power p is derived from the approximation of the modulation parameter "m". The recording power control algorithm accurately checks the rising slope of the modulation parameter related to the reproduced data signal, and the optical recording/reproducing method and apparatus of the present invention are effective in minimizing variations of the optimum recording power through the recording power control algorithm and in accurately producing the optimum recording power without being affected by noise. As the selection of an improper recording power can be safely prevented, the optical recording/reproducing method and apparatus of the present invention can provide good recording characteristics and protect the light source of the optical pickup and the recording layer of the optical disk against damage.

In the above embodiments, the value of the variable Pt obtained by the recording power control algorithm is provided as the value indicating the optimum recording power. However, in certain cases, it is preferred that the value of the variable Pt multiplied by a known constant, which is specific to the optical disk, is provided as the value indicating the optimum recording power.

In the above embodiments, any of various optical storage media that are provided for recording and reproducing of information, including CD-DA, CD-ROM, CD-R, DVD-ROM, DVD-R, etc. may be provided as the optical disk 101. In addition, in order to eliminate the influences of reflected light beams, the values of (pk−bt)/((pk+bt)/2) may be provided as the reproduced signal amplitude, instead of the value of (pk−bt) used in the above embodiments.

The present invention is not limited to the above-described embodiments, and variations and modifications may be made without departing from the scope of the present invention.

Further, the present invention is based on Japanese priority application No.11-366806, filed on Dec. 24, 1999, the entire contents of which are hereby incorporated by reference.

What is claimed is:

1. An optical recording/reproducing method comprising the steps of:

performing a test writing in which writing a pattern of marks and spaces to an optical storage medium with a recording power p is repeated by sequentially changing the recording power p with increments of a predetermined power;

performing a test reading in which reading the pattern from the storage medium is repeated, so that data signals are reproduced from the respective patterns on the storage medium;

calculating a modulation parameter m for each of the reproduced data signals, each modulation parameter corresponding to one of the respective recording powers; and determining an optimum recording power based on a relationship between the modulation parameters and the respective recording powers, wherein the determining step comprises the steps of:

selecting, from all of the modulation parameters and the recording powers, a sequence of pairs of the modulation parameter m and the recording power p;

calculating a gamma=$(\Delta m/m)/(\Delta p/p)$ for each of the selected pairs of the modulation parameter m and the recording power p, the gamma defining a ratio of a change of the modulation parameter m, normalized by a modulation parameter value, to a change of the recording power p, normalized by a recording power value; and finding a target recording power corresponding to the optimum recording power based on a function derived from a relationship between the calculated gammas and the respective recording powers, the target recording power causing a value of the function to be equal to zero, wherein, in the selecting step, a pair of the modulation parameter m and the recording power p is omitted if a value of the modulation parameter of the pair is not larger than a first threshold value th1, and a pair of the modulation parameter m and the recording power p is selected if a value of the modulation parameter of a following pair first exceeds the first threshold value th1.

2. The optical recording/reproducing method of claim 1 wherein, in the selecting step, a pair of the modulation parameter m and the recording power p is selected if a value of the modulation parameter of a following pair first exceeds the first threshold value th1 and is larger than a second threshold value th2 (th2>th1 ).

3. An optical recording/reproducing method comprising the steps of:

performing a test writing in which writing a pattern of marks and spaces to an optical storage medium with a recording power p is repeated by sequentially changing the recording power p with increments of a predetermined power;

performing a test reading in which reading the pattern from the storage medium is repeated, so that data signals are reproduced from the respective patterns on the storage medium;

calculating a modulation parameter m for each of the reproduced data signals, each modulation parameter corresponding to one of the respective recording powers; and determining an optimum recording power based on a relationship between the modulation parameters and the respective recording powers, wherein the determining step comprises the steps of:

selecting, from all of the modulation parameters and the recording powers, a sequence of pairs of the modulation parameter m and the recording power p;

approximating the modulation parameter into a continuous function m(p) of the recording power p based on the selected pairs of the modulation parameter m and the recording power p; and finding a target recording power corresponding to the optimum recording power, based on a derivative function (dm/dp) of the function m(p) with respect to the recording power p, the target recording power causing a value of (dm/dp)*(p/m) to be equal to a predetermined value, wherein, in the selecting step, a pair of the modulation parameter m and the recording power p is omitted if a value of the modulation parameter of the pair is not larger than a first threshold value th1, and a pair of the modulation parameter m and the recording power p is selected if a value of the modulation parameter of a following pair first exceeds the first threshold value th1.

4. The optical recording/reproducing method of claim 3 wherein, in the selecting step, a pair of the modulation parameter m and the recording power p is selected if a value of the modulation parameter of a following pair first exceeds the first threshold value th1 and is larger than a second threshold value th2 (th2>th1 ).

5. An optical recording/reproducing method comprising the steps of:

performing an initial test writing in which writing a pattern of marks and spaces to an optical storage medium with a recording power p is repeated by sequentially changing the recording power p with first increments of a predetermined power;

performing an initial test reading in which reading the pattern from the storage medium is repeated, so that data signals are reproduced from the respective patterns on the storage medium;

calculating a first modulation parameter m for each of the reproduced data signals, each first modulation parameter corresponding to one of the respective recording powers;

setting a first recording power pth by finding a pair of the first modulation parameter m and the recording power p, from among all pairs of the first modulation parameters and the respective recording powers, a value of the first modulation parameter of the pair first exceeding a first threshold value th;

performing a secondary test writing in which writing the pattern of marks and spaces to the storage medium with the recording power p, substantially centered on the first recording power pth, is repeated by sequentially changing the recording power p with second smaller increments of a predetermined power;

performing a secondary test reading in which reading the pattern from the storage medium is repeated, so that data signals are reproduced from the respective patterns on the storage medium;

calculating a second modulation parameter m for each of the reproduced data signals, each second modulation parameter corresponding to one of the respective recording powers;

selecting, from all of the second modulation parameters and the recording powers, a sequence of pairs of the second modulation parameter m and the recording power p;

calculating a gamma=$(\Delta m/m)/(\Delta p/p)$ for each of the selected pairs of the second modulation parameter m and the recording power p, the gamma defining a ratio of a change of the second modulation parameter m, normalized by a modulation parameter value, to a change of the recording power p, normalized by a recording power value; and finding a target recording power corresponding to an optimum recording power based on a function derived from a relationship between the calculated gammas and the respective recording powers, the target recording power causing a value of the function to be equal to zero.

6. The optical recording/reproducing method of claim 5, wherein, in the selecting step, a pair of the second modulation parameter m and the recording power p is omitted if a value of the second modulation parameter of the pair is not larger than a third threshold value th3, and a pair of the second modulation parameter m and the recording power p is selected if a value of the second modulation parameter of a following pair first exceeds the third threshold value th3.

7. The optical recording/reproducing method of claim 6, wherein, in the selecting step, a pair of the second modulation parameter m and the recording power p is selected if a value of the second modulation parameter of a following pair first exceeds the third threshold value th3 and is larger than a fourth threshold value th4 (th4>th3 ).

8. An optical recording/reproducing method comprising the steps of:

performing an initial test writing in which writing a pattern of marks and spaces to an optical storage medium with a recording power p is repeated by sequentially changing the recording power p with first increments of a predetermined power;

performing an initial test reading in which reading the pattern from the storage medium is repeated, so that data signals are reproduced from the respective patterns on the storage medium;

calculating a first modulation parameter m for each of the reproduced data signals, each first modulation parameter corresponding to one of the respective recording powers;

setting a first recording power pth by finding a pair of the first modulation parameter m and the recording power p, from among all pairs of the first modulation parameters and the respective recording powers, a value of the first modulation parameter of the pair first exceeding a first threshold value th;

performing a secondary test writing in which writing the pattern of marks and spaces to the storage medium with the recording power p, substantially centered on the first recording power pth, is repeated by sequentially changing the recording power p with second smaller increments of a predetermined power;

performing a secondary test reading in which reading the pattern from the storage medium is repeated, so that data signals are reproduced from the respective patterns on the storage medium;

calculating a second modulation parameter m for each of the reproduced data signals, each second modulation parameter corresponding to one of the respective recording powers;

selecting, from all of the second modulation parameters and the recording powers, a sequence of pairs of the second modulation parameter m and the recording power p;

approximating the second modulation parameter into a continuous function m(p) of the recording power p based on the selected pairs of the second modulation parameter m and the recording power p; and finding a target recording power corresponding to an optimum recording power, based on a derivative function (dm/dp) of the function m(p) with respect to the recording power p, the target recording power causing a value of (dm/dp)*(p/m) to be equal to a predetermined value.

9. The optical recording/reproducing method of claim 8, wherein, in the selecting step, a pair of the second modulation parameter m and the recording power p is omitted if a value of the second modulation parameter of the pair is not larger than a third threshold value th3, and a pair of the second modulation parameter m and the recording power p is selected if a value of the second modulation parameter of a following pair first exceeds the third threshold value th3.

10. The optical recording/reproducing method of claim 9, wherein, in the selecting step, a pair of the second modulation parameter m and the recording power p is selected if a value of the second modulation parameter of a following pair first exceeds the third threshold value th3 and is larger than a fourth threshold value th4 (th4>th3 ).

11. The optical recording/reproducing method of claim 1, wherein the gamma is approximated into a continuous function of the recording power p, and the target recording power is determined based on the continuous function of the recording power p.

12. An optical recording/reproducing apparatus comprising:

a test writing unit performing a test writing in which writing a pattern of marks and spaces to an optical storage medium with a recording power p is repeated by sequentially changing the recording power p with increments of a predetermined power;

a test reading unit performing a test reading in which reading the pattern from the storage medium is repeated, so that data signals are reproduced from the respective patterns on the storage medium;

a calculation unit calculating a modulation parameter m for each of the reproduced data signals, each modulation parameter corresponding to one of the respective recording powers; and a determination unit determining an optimum recording power based on a relationship between the modulation parameters and the respective recording powers, wherein the determination unit comprises:

a selection unit selecting, from all of the modulation parameters and the recording powers, a sequence of pairs of the modulation parameter m and the recording power p;

a gamma calculation unit calculating a gamma=($\Delta$m/m)/($\Delta$p/p) for each of the selected pairs of the modulation parameter m and the recording power p, the gamma defining a ratio of a change of the modulation parameter m, normalized by a modulation parameter value, to a change of the recording power p, normalized by a recording power value; and a target recording power unit finding a target recording power corresponding to the optimum recording power based on a function derived from a relationship between the calculated gammas and the respective recording powers, the target recording power causing a value of the function to be equal to zero, wherein the selection unit omits a pair of the modulation parameter m and the recording power p if a value of the modulation parameter of the pair is not larger than a first threshold value th1, and selects a pair of the modulation parameter m and the recording power p if a value of the modulation parameter of a following pair first exceeds the first threshold value th1.

13. The optical recording/reproducing apparatus of claim 12 wherein the selection unit selects a pair of the modulation parameter m and the recording power p if a value of the modulation parameter of a following pair first exceeds the first threshold value th1 and is larger than a second threshold value th2 (th2>th1 ).

14. An optical recording/reproducing apparatus comprising:

a test writing unit performing a test writing in which writing a pattern of marks and spaces to an optical storage medium with a recording power p is repeated by sequentially changing the recording power p with increments of a predetermined power;

a test reading unit performing a test reading in which reading the pattern from the storage medium is repeated, so that data signals are reproduced from the respective patterns on the storage medium;

a calculation unit calculating a modulation parameter m for each of the reproduced data signals, each modulation parameter corresponding to one of the respective recording powers; and a determination unit determining an optimum recording power based on a relationship between the modulation parameters and the respective recording powers, wherein the determination unit comprises:
  a selection unit selecting, from all of the modulation parameters and the recording powers, a sequence of pairs of the modulation parameter m and the recording power p;
  an approximation unit approximating the modulation parameter into a continuous function m(p) of the recording power p based on the selected pairs of the modulation parameter m and the recording power p; and
  a target recording power unit finding a target recording power corresponding to the optimum recording power, based on a derivative function (dm/dp) of the function m(p) with respect to the recording power p, the target recording power causing a value of (dm/dp)*(p/m) to be equal to a predetermined value,
  wherein the selection unit omits a pair of the modulation parameter m and the recording power p if a value of the modulation parameter of the pair is not larger than a first threshold value th1, and selects a pair of the modulation parameter m and the recording power p if a value of the modulation parameter of a following pair first exceeds the first threshold value th1.

15. The optical recording/reproducing apparatus of claim 14, wherein the selection unit selects a pair of the modulation parameter m and the recording power p if a value of the modulation parameter of a following pair first exceeds the first threshold value th1 and is larger than a second threshold value th2 (th2>th1).

16. An optical recording/reproducing apparatus comprising:
  a first test writing unit performing an initial test writing in which writing a pattern of marks and spaces to an optical storage medium with a recording power p is repeated by sequentially changing the recording power p with first increments of a predetermined power;
  a first test reading unit performing an initial test reading in which reading the pattern from the storage medium is repeated, so that data signals are reproduced from the respective patterns on the storage medium;
  a first calculation unit calculating a first modulation parameter m for each of the reproduced data signals, each first modulation parameter corresponding to one of the respective recording powers;
  a recording power unit setting a first recording power pth by finding a pair of the first modulation parameter m and the recording power p, from among all pairs of the first modulation parameters and the respective recording powers, a value of the first modulation parameter of the pair first exceeding a first threshold value th;
  a second test writing unit performing a secondary test writing in which writing the pattern of marks and spaces to the storage medium with the recording power p, substantially centered on the first recording power pth, is repeated by sequentially changing the recording power p with second smaller increments of a predetermined power;
  a second test reading unit performing a secondary test reading in which reading the pattern from the storage medium is repeated, so that data signals are reproduced from the respective patterns on the storage medium;
  a second calculation unit calculating a second modulation parameter m for each of the reproduced data signals, each second modulation parameter corresponding to one of the respective recording powers;
  a selection unit selecting, from all of the second modulation parameters and the recording powers, a sequence of pairs of the second modulation parameter m and the recording power p;
  a gamma calculation unit calculating a gamma=(Δm/m)/(Δp/p) for each of the selected pairs of the second modulation parameter m and the recording power p, the gamma defining a ratio of a change of the second modulation parameter m, normalized by a modulation parameter value, to a change of the recording power p, normalized by a recording power value; and
  a target recording power unit finding a target recording power corresponding to an optimum recording power based on a function derived from a relationship between the calculated gammas and the respective recording powers, the target recording power causing a value of the function to be equal to zero.

17. The optical recording/reproducing apparatus of claim 16, wherein the selection unit omits a pair of the second modulation parameter m and the recording power p if a value of the second modulation parameter of the pair is not larger than a third threshold value th3, and selects a pair of the second modulation parameter m and the recording power p if a value of the second modulation parameter of a following pair first exceeds the third threshold value th3.

18. The optical recording/reproducing apparatus of claim 17, wherein the selection unit selects a pair of the second modulation parameter m and the recording power p if a value of the second modulation parameter of a following pair first exceeds the third threshold value th3 and is larger than a fourth threshold value th4 (th4>th3).

19. An optical recording/reproducing apparatus comprising:
  a first test writing unit performing an initial test writing in which writing a pattern of marks and spaces to an optical storage medium with a recording power p is repeated by sequentially changing the recording power p with first increments of a predetermined power;
  a first test reading unit performing an initial test reading in which reading the pattern from the storage medium is repeated, so that data signals are reproduced from the respective patterns on the storage medium;
  a first calculation unit calculating a first modulation parameter m for each of the reproduced data signals, each first modulation parameter corresponding to one of the respective recording powers;
  a recording power unit setting a first recording power pth by finding a pair of the first modulation parameter m and the recording power p, from among all pairs of the first modulation parameters and the respective recording powers, a value of the first modulation parameter of the pair first exceeding a first threshold value th;
  a second test writing unit performing a secondary test writing in which writing the pattern of marks and spaces to the storage medium with the recording power p, substantially centered on the first recording power pth, is repeated by sequentially changing the recording power p with second smaller increments of a predetermined power;
  a second test reading unit performing a secondary test reading in which reading the pattern from the storage medium is repeated, so that data signals are reproduced from the respective patterns on the storage medium;
  a second calculation unit calculating a second modulation parameter m for each of the reproduced data signals, each second modulation parameter corresponding to one of the respective recording powers;

a selection unit selecting, from all of the second modulation parameters and the recording powers, a sequence of pairs of the second modulation parameter m and the recording power p;

a function approximation unit approximating the second modulation parameter into a continuous function m(p) of the recording power p based on the selected pairs of the second modulation parameter m and the recording power p; and a target recording power unit finding a target recording power corresponding to an optimum recording power, based on a derivative function (dm/dp) of the function m(p) with respect to the recording power p, the target recording power causing a value of (dm/dp)*(p/m) to be equal to a predetermined value.

20. The optical recording/reproducing apparatus of claim 19, wherein the selection unit omits a pair of the second modulation parameter m and the recording power p if a value of the second modulation parameter of the pair is not larger than a third threshold value th3, and selects a pair of the second modulation parameter m and the recording power p if a value of the second modulation parameter of a following pair first exceeds the third threshold value th3.

21. The optical recording/reproducing apparatus of claim 20, wherein the selection unit selects a pair of the second modulation parameter m and the recording power p if a value of the second modulation parameter of a following pair first exceeds the third threshold value th3 and is larger than a fourth threshold value th4 (th4>th3).

22. The optical recording/reproducing apparatus of claim 12, wherein the gamma is approximated into a continuous function of the recording power p, and the target recording power is determined based on the continuous function of the recording power p.

* * * * *

UNITED STATES PATENT AND TRADEMARK OFFICE
CERTIFICATE OF CORRECTION

PATENT NO.    : 6,621,780 B2
DATED         : September 16, 2003
INVENTOR(S)   : Haruyuki Suzuki It is certified that error appears in the above-identified patent and that said Letters Patent is hereby corrected as shown below:

<u>Title page,</u>
Item [56], References Cited, U.S. PATENT DOCUMENTS, "5,872,673", should read -- 5,872,763 --.

Signed and Sealed this

Twenty-ninth Day of June, 2004

JON W. DUDAS
*Acting Director of the United States Patent and Trademark Office*